United States Patent
Cheung et al.

(10) Patent No.: US 7,801,570 B2
(45) Date of Patent: Sep. 21, 2010

(54) DIRECTIONAL SPEAKER FOR PORTABLE ELECTRONIC DEVICE

(75) Inventors: Kwok Wai Cheung, Hong Kong (HK);
Peter P. Tong, Mountain View, CA (US);
C. Douglass Thomas, Campbell, CA (US)

(73) Assignee: IpVenture, Inc., Los Altos, CA (US)

( * ) Notice: Subject to any disclaimer, the term of this patent is extended or adjusted under 35 U.S.C. 154(b) by 1130 days.

(21) Appl. No.: 10/826,531

(22) Filed: Apr. 15, 2004

(65) Prior Publication Data

US 2004/0209654 A1    Oct. 21, 2004

Related U.S. Application Data

(60) Provisional application No. 60/493,441, filed on Aug. 8, 2003, provisional application No. 60/469,221, filed on May 12, 2003, provisional application No. 60/462,570, filed on Apr. 15, 2003.

(51) Int. Cl.
*H04M 1/00* (2006.01)
*H04B 3/00* (2006.01)

(52) U.S. Cl. .................. 455/569.1; 381/77

(58) Field of Classification Search ........... 381/77, 381/86, 303, 306, 387, 388, 334, 386, 79, 381/356; 455/569.2, 569.1, 556.1, 556.2, 455/557, 575.1, 575.9, 350, 90.1, 344, 66.1, 455/550.1, 90.3, 599.2; 280/735; 348/14.16; 379/420.04, 433.02; 367/137, 138

See application file for complete search history.

(56) References Cited

U.S. PATENT DOCUMENTS

| | | | |
|---|---|---|---|
| 3,942,139 A | 3/1976 | Cooper et al. | |
| 3,974,335 A | 8/1976 | Blackledge | |
| 4,006,308 A | 2/1977 | Ponsgen | |
| 4,128,738 A | 12/1978 | Gallery | |
| 4,292,679 A * | 9/1981 | Kondo et al. | 367/188 |
| 4,476,571 A | 10/1984 | Tokumo et al. | |
| 4,622,440 A | 11/1986 | Slavin | |
| 4,625,318 A | 11/1986 | Snyder | |
| 4,823,908 A | 4/1989 | Tanaka | |
| 4,955,729 A | 9/1990 | Marx | |

(Continued)

FOREIGN PATENT DOCUMENTS

JP    01109898 A    4/1989

(Continued)

OTHER PUBLICATIONS

Brain; Marshall, How USB Ports Work, Oct. 11, 2002, www.howstuffworks.com/usb.*

(Continued)

*Primary Examiner*—Vivian Chin
*Assistant Examiner*—Kile Blair

(57) ABSTRACT

A directional speaker for an electronic device having audio output capabilities is disclosed. The directional speaker can thus be used with the electronic device to direct audio output in a directionally constrained manner. As a result, a certain degree of privacy with respect to the audio output is achieved for the user of the electronic device, yet the user need not wear a headset or ear phone, or have to hold a speaker against one's ear. The directional speaker can be integral with the electronic device. Alternatively, the directional speaker can be an attachment (or peripheral) to the electronic device.

12 Claims, 15 Drawing Sheets

U.S. PATENT DOCUMENTS

| | | | |
|---|---|---|---|
| 5,313,663 A | 5/1994 | Norris | |
| 5,321,758 A | 6/1994 | Charpentier et al. | |
| 5,357,578 A | 10/1994 | Taniishi | |
| 5,450,494 A | 9/1995 | Okubo et al. | |
| 5,481,616 A * | 1/1996 | Freadman | 381/333 |
| 5,495,534 A | 2/1996 | Inanaga et al. | |
| 5,526,411 A | 6/1996 | Krieter | |
| 5,572,575 A | 11/1996 | Yamamoto et al. | |
| 5,588,041 A * | 12/1996 | Meyer et al. | 455/569.2 |
| 5,648,824 A | 7/1997 | Dunn et al. | |
| 5,666,424 A | 9/1997 | Fosgate et al. | |
| 5,682,157 A | 10/1997 | Asmussen et al. | |
| 5,764,595 A | 6/1998 | Power | |
| 5,764,782 A | 6/1998 | Hayes | |
| 5,777,665 A * | 7/1998 | McNelley et al. | 348/14.16 |
| 5,793,875 A | 8/1998 | Lehr et al. | |
| 5,802,190 A | 9/1998 | Ferren | |
| 5,819,183 A | 10/1998 | Voroba et al. | |
| 5,828,768 A | 10/1998 | Eatwell et al. | |
| 5,835,732 A | 11/1998 | Kikinis et al. | |
| 5,870,484 A | 2/1999 | Greenberger | |
| 5,943,430 A | 8/1999 | Saitoh | |
| 6,011,855 A | 1/2000 | Selfridge et al. | |
| 6,058,315 A | 5/2000 | Clark | |
| 6,086,541 A | 7/2000 | Rho | |
| 6,151,398 A * | 11/2000 | Norris | 381/77 |
| 6,163,711 A * | 12/2000 | Juntunen et al. | 455/557 |
| 6,169,813 B1 | 1/2001 | Richardson et al. | |
| 6,243,472 B1 | 6/2001 | Bilan et al. | |
| 6,259,731 B1 | 7/2001 | Dent et al. | |
| 6,275,596 B1 | 8/2001 | Fretz et al. | |
| 6,279,946 B1 * | 8/2001 | Johnson et al. | 280/735 |
| 6,322,521 B1 | 11/2001 | Hou | |
| 6,363,139 B1 | 3/2002 | Zurek et al. | |
| 6,445,804 B1 * | 9/2002 | Hirayanagi | 381/303 |
| 6,453,045 B1 | 9/2002 | Zurek et al. | |
| 6,477,258 B1 | 11/2002 | Watson et al. | |
| 6,484,040 B1 * | 11/2002 | Wang | 455/569.2 |
| 6,496,205 B1 | 12/2002 | White et al. | |
| 6,498,970 B2 * | 12/2002 | Colmenarez et al. | 701/36 |
| 6,512,826 B1 * | 1/2003 | Kim | 379/420.04 |
| 6,535,612 B1 | 3/2003 | Croft, III et al. | |
| 6,556,687 B1 | 4/2003 | Manabe | |
| 6,584,205 B1 | 6/2003 | Croft, III et al. | |
| 6,591,085 B1 * | 7/2003 | Grady | 455/42 |
| 6,594,367 B1 | 7/2003 | Marash et al. | |
| 6,631,196 B1 | 10/2003 | Taenzer et al. | |
| 6,643,377 B1 * | 11/2003 | Takahashi et al. | 381/306 |
| 6,650,755 B2 | 11/2003 | Vaudrey et al. | |
| 6,671,494 B1 | 12/2003 | James | |
| 6,895,261 B1 | 5/2005 | Palamides | |
| 7,013,009 B2 | 3/2006 | Warren | |
| 7,269,452 B2 | 9/2007 | Cheung | |
| 2001/0007591 A1 | 7/2001 | Pompei | |
| 2001/0038698 A1 * | 11/2001 | Breed et al. | 381/86 |
| 2001/0055397 A1 | 12/2001 | Norris et al. | |
| 2002/0005777 A1 | 1/2002 | Rodewald et al. | |
| 2002/0008718 A1 | 1/2002 | Obradovich | |
| 2002/0012441 A1 | 1/2002 | Matsunaga et al. | |
| 2002/0048382 A1 | 4/2002 | Hou | |
| 2002/0048385 A1 | 4/2002 | Rosenberg | |
| 2002/0054689 A1 | 5/2002 | Zhang et al. | |
| 2002/0090099 A1 | 7/2002 | Hwang | |
| 2002/0090103 A1 | 7/2002 | Calisto, Jr. | |
| 2002/0141599 A1 | 10/2002 | Trajkovic et al. | |
| 2002/0149705 A1 | 10/2002 | Allen et al. | |
| 2002/0183648 A1 | 12/2002 | Hou | |
| 2002/0191807 A1 | 12/2002 | Asada et al. | |
| 2003/0009248 A1 | 1/2003 | Wiser et al. | |
| 2003/0026439 A1 | 2/2003 | Yamamoto et al. | |
| 2003/0035552 A1 | 2/2003 | Kolano et al. | |
| 2003/0091200 A1 | 5/2003 | Pompei | |
| 2003/0092377 A1 | 5/2003 | Hill | |
| 2003/0118198 A1 | 6/2003 | Croft, III et al. | |
| 2003/0156495 A1 | 8/2003 | Haase et al. | |
| 2003/0174242 A1 * | 9/2003 | Carmi et al. | 348/376 |
| 2003/0182104 A1 | 9/2003 | Muesch | |
| 2004/0052387 A1 | 3/2004 | Norris et al. | |
| 2004/0114772 A1 * | 6/2004 | Zlotnick | 381/92 |
| 2004/0202339 A1 | 10/2004 | O'Brien et al. | |
| 2004/0204168 A1 | 10/2004 | Laurila | |
| 2007/0287516 A1 | 12/2007 | Cheung | |

FOREIGN PATENT DOCUMENTS

| | | |
|---|---|---|
| KR | 2001-0091117 A | 10/2001 |

OTHER PUBLICATIONS

American Technology Corporation, HyperSonic Sound, Jan. 22, 2002, www.atcsd.com.*

PCT International Search Report, RE: PCT/US04/11972, Jan. 31, 2005.

PCT Written Opinion of the International Searching Authority, RE: PCT/US04/11972, Jan. 31, 2005.

"Audio Spotlight—Put sound where you want it," Holosonic Research Labs, Inc., 2002, www.holosonics.com/technology.html (downloaded Jan. 18, 2004).

"Technology Introduction," American Technology Corporation, 2001, pp. 1-19.

"Technology Licensing—HyperSonic Sound," American Technology Corporation, 2003, pp. 1-3.

"Theory, History, and the Advancement of Parametric Loudspeakers—A Technology Overview," White Paper, American Technology Corporation, 2002, pp. 1-27.

"HSS Directed Audio Sound System, Model Series: 220," Product Information, American Technology Corporation, 2003.

A. C. Baker, "Nonlinear pressure fields due to focused circular apertures," The Journal of the Acoustical Society of America, 91(2), Feb. 1992, pp. 713-717.

A.L. Vyas et al., "Design Considerations of Parametric Arrays," IEEE Proceedings of the 1998 International Symposium on Underwater Technology, Apr. 15-17, 1998, pp. 98-102.

B. G. Lucas et al., "Field of a parametric focusing source," The Journal of the Acoustical Society of America, 73 (6), Jun. 1983, pp. 1966-1971.

B.G. Lucas et al., "The field of a focusing source," The Journal of the Acoustical Society of America, 72(4), Oct. 1982, pp. 1289-1296.

B.W. Lawton, "Damage to human hearing by airborne sound of a very high frequency or ultrasonic frequency," Institute of Sound and Vibration Research, Contract Research Report 343/2001, 2001, pp. 1-77.

C. M. Darvennes et al., "Scattering of sound by sound from two Gaussian beams," The Journal of the Acoustical Society of America, 87(5), May 1990, pp. 1955-1964.

C.M. Darvennes et al., "Effects of absorption on the nonlinear interaction of sound beams," The Journal of the Acoustical Society of America, 89(3), Mar. 1991, pp. 1028-1036.

D. Marculescu et al., "Ready to Ware," IEEE Spectrum, Oct. 2003, pp. 28-32.

D.I. Havelock, "Directional Loudspeakers Using Sound Beams," J. Audio Eng. Soc., vol. 48, No. 10, Oct. 2000, pp. 908-916.

E.A. Zabolotskaya et al., "Quasi-plane Waves in the Nonlinear Acoustics of Confined Beams," Soviet Physics-Acoustics, vol. 15, No. 1, Jul.-Sep. 1969, pp. 35-40.

F.J. Pompei, "The Use of Airborne Ultrasonics for Generating Audible Sound Beams," J. Audio Eng. Soc., vol. 47, No. 9, Sep. 1999, pp. 726-731.

G. Garrett et al., "Nearfield of a large acoustic transducer, Part II: Parametric radiation," The Journal of the Acoustical Society of America, 74(3), Sep. 1983, pp. 1013-1020.

G. Garrett et al., "Nearfield of a large acoustic transducer. Part III: General results," The Journal of the Acoustical Society of America, 75(3), Mar. 1984, pp. 769-779.

H.O. Berktay, "Possible Exploitation of Non-Linear Acoustics in Underwater Transmitting Applications," J. Sound Vib. (1965) 2(4), 435-461.

i60c Phone User's Guide, Nextel Communications, 2002, pp. 6, 65, 66, 135-137.

J. Berntsen et al., "Interaction of sound waves. Part IV: Scattering of sound by sound,"The Journal of the Acoustical Society of America, 86(5), Nov. 1989, pp. 1968-1983.

J. Berntsen et al., "Nearfield of a large acoustic transducer. Part IV: Second harmonic and sum frequency radiation," The Journal of the Acoustical Society of America, 75(5), May 1984, pp. 1383-1391.

J. Meyer, "Microphone Array for Hearing Aids taking into Account the Scattering of the Head," 2001 IEEE Workshop on Applications of Signal Processing to Audio and Acoustics, Oct. 21-24, 2001, pp. 27-30.

J. N. Tjotta et al., "Propagation and interaction of two collinear finite amplitude sound beams," The Journal of the Acoustical Society of America, 88(6), Dec. 1990, pp. 2859-2870.

J. Zemanek, "Beam Behavior within the Nearfield of a Vibrating Piston," The Journal of the Acoustical Society of America, vol. 42, No. 1 (Part 2), 1971, pp. 181-191.

K. Aoki et al., "Parametric Loudspeaker-Applied Examples," Electronics and Communications in Japan, Part 3, vol. 77, No. 1, 1994, pp. 64-74.

K. Maney, "Sound technology turns the way you hear on its ear," USA Today, May 2003, pp. 1-4.

M. Greenspan, "Piston radiator: Some extensions of the theory," The Journal of the Acoustical Society of America, 65(3), Mar. 1979, pp. 608-621.

M. Yoneyama et al., "The audio spotlight: An application of nonlinear interaction of sound waves to a new type of loudspeaker design," The Journal of the Acoustical Society of America, 73(5), May 1983, pp. 1532-1536.

M.A. Averkiou et al., "Self-demodulation of amplitude- and frequency-modulated pulses in a thermoviscous fluid," The Journal of the Acoustical Society of America, 94(5), Nov. 1993, pp. 2876-2883.

M.B. Bennett et al., "Parametric array in air," The Journal of the Acoustical Society of America, vol. 57, No. 3, Mar. 1975, pp. 562-568.

Nextel i60c Phone Details, http://nextelonline.nextel.com, downloaded Apr. 22, 2003, pp. 1-2.

Nextel-Direct Connect, http://nextelonline.nextel.com/services/directconnect-popup.html, downloaded Apr. 22, 2003, p. 1.

P.J. Westervelt, "Parametric Acoustic Array," The Journal of the Acoustical Society of America, vol. 35, No. 4, Apr. 1963, pp. 535-537.

Palm™ m515 Handheld, Palm Store of Yahoo! Shopping, downloaded Apr. 23, 2003, pp. 1-2.

Palm™ PalmModem® Connectivity Kit, Palm Store of Yahoo! Shopping, downloaded Apr. 23, 2003, pp. 1-2.

Palm™ Tungsten™ C Handheld, Palm Store of Yahoo! Shopping, downloaded Apr. 23, 2003, pp. 1-3.

Palm™ Zire™ 71 Handheld, Palm Store of Yahoo! Shopping, downloaded Apr. 23, 2003, pp. 1-3.

T. Kamakura et al., "Suitable Modulation of the Carrier Ultrasound for a-Parametric Loudspeaker," Acustica, vol. 73 (1991), pp. 215-217.

T. Kamakura et al., "Harmonic generation in finite amplitude sound beams from a rectangular aperture source," The Journal of the Acoustical Society of America, 91(6), Jun. 1992, pp. 3144-3151.

T. Kamakura et al., "Nonlinearly generated spectral components in the nearfield of a directive sound source," The Journal of the Acoustical Society of America, 85(6), Jun. 1989, pp. 2331-2337.

T.D. Kite et al., "Parametric Array in Air: Distortion Reduction by Preprocessing," Proceedings of the 16th International Congress on Acoustics and the 135th Meeting of the Acoustical Society of America, Seattle, WA, Jun. 1998, pp. 1091-1092.

T.G. Muir et al., "Parametric Acoustic Transmitting Arrays," The Journal of the Acoustical Society of America, vol. 52, No. 5, Part 2, 1972, pp. 1481-1486.

V.P. Kuznetsov, "Equations of Nonlinear Acoustics," Soviet Physics-Acoustics, vol. 16, No. 4, Apr.-Jun. 1971, pp. 467-470.

W.F. Druyvesteyn et al., "Personal Sound," J. Audio Eng. Soc., vol. 45, No. 9, Sep. 1997, pp. 685-701.

Y.W. Kim et al., "Novel Preprocessing Technique to Improve Harmonic Distortion in Airborne Parametric Array," ICSP '02 Proceedings, pp. 1815-1818.

Z.A. Gol'dberg, "Certain Second-Order Quantities in Acoustics," Sov Phys Acoust, vol. 3, 1957, pp. 157-162.

Office Action, re: CN 200480010388.8, Chinese Patent Office, Apr. 17, 2009, 8 pages.

Second Office Action re: CN200480010388.8 Chinese Patent Office, Sep. 4, 2009, 6 pages.

Aoki, K. et al., "Self-demodulation of a plane-wave—Study on primary wave modulation for wideband signal transmission," J. Acoust. Soc. Jpn., pp. 349-356, 1984 (with English abstract).

Blackstock, David T., "Audio Application of the Parametric Array," J. Acoust. Soc. Am, vol. 102, No. 5, Pt. 2, Nov. 1997, p. 3106.

Davy, B. A., "Acoustic Self-demodulation of Pre-distorted Pulsed Carriers," Masters' Thesis, University of Texas Austin, 1972, title page, pp. i-ix, and 1-57.

Kamakura, T. et al, "Developments of Parametric Loudspeaker for Practical Use", Proceedings of the 10th International Symposium on Nonlinear Acoustics, pp. 147-150, 1984.

Kim, W. et al, "Audio Application of the Parametric Array—Implementation through a Numerical Model," presented at the 113th Convention of the Audio Engineering Society (AES), paper 5652, Oct. 2002, pp. 1-16.

"The Cookie-Size Concert Hall," Business Week, Dec. 2, 1996, 5 pages.

* cited by examiner

DIRECTIONAL SPEAKER FOR PORTABLE ELECTRONIC DEVICE

CROSS-REFERENCE TO RELATED APPLICATIONS

This application claims priority of: (i) U.S. Provisional Patent Application No. 60/462,570, filed Apr. 15, 2003, and entitled "WIRELESS COMMUNICATION SYSTEMS OR DEVICES, HEARING ENHANCEMENT SYSTEMS OR DEVICES, AND METHODS THEREFOR," which is hereby incorporated herein by reference; (ii) U.S. Provisional Patent Application No. 60/469,221, filed May 12, 2003, and entitled "WIRELESS COMMUNICATION SYSTEMS OR DEVICES, HEARING ENHANCEMENT SYSTEMS OR DEVICES, DIRECTIONAL SPEAKER FOR ELECTRONIC DEVICE, PERSONALIZED AUDIO SYSTEMS OR DEVICES, AND METHODS THEREFOR," which is hereby incorporated herein by reference; and (iii) U.S. Provisional Patent Application No. 60/493,441, filed Aug. 8, 2003, and entitled "WIRELESS COMMUNICATION SYSTEMS OR DEVICES, HEARING ENHANCEMENT SYSTEMS OR DEVICES, DIRECTIONAL SPEAKER FOR ELECTRONIC DEVICE, AUDIO SYSTEMS OR DEVICES, WIRELESS AUDIO DELIVERY, AND METHODS THEREFOR," which is hereby incorporated herein by reference.

This application is also related to: (i) U.S. patent application Ser. No. 10/826,529, filed concurrently, now U.S. Pat. No. 7,269,452, and entitled, "DIRECTIONAL WIRELESS COMMUNICATION SYSTEMS," which is hereby incorporated herein by reference; (ii) U.S. patent application Ser. No. 10/826,527, filed concurrently, and entitled, "DIRECTIONAL HEARING ENHANCEMENT SYSTEMS," which is hereby incorporated herein by reference; (iii) U.S. patent application Ser. No. 10/826,537, filed concurrently, and entitled, "METHOD AND APPARATUS FOR LOCALIZED DELIVERY OF AUDIO SOUND FOR ENHANCED PRIVACY," which is hereby incorporated herein by reference; and (iv) U.S. patent application Ser. No. 10/826,528, filed concurrently, and entitled, "METHOD AND APPARATUS FOR WIRELESS AUDIO DELIVERY," which is hereby incorporated herein by reference.

FIELD OF THE INVENTION

The present invention relates to portable electronic devices and, more particularly, to directional speakers for portable electronic devices.

BACKGROUND OF THE INVENTION

Today, cellular telephones primarily include only a small speaker, sometime known as an earpiece, that is designed to be placed against the user's ear when the cellular telephone is in use. However, this means that the user cannot clearly hear the audio output from the speaker unless the cellular telephone is placed against the user's ear, with one of the user's hands being used to hold the cellular telephone against the ear. Further, it means that if the user should need to interact with the cellular telephone, such as entering phone numbers, the user would not be able to, in most cases, keep the earpiece against the user's ear. As a result, the user would not be able to simultaneously hear audio output while interacting with the cellular telephone. Use of headsets whether wired or wireless, can alleviate some of these difficulties. However, headsets and ear phones can be inconvenient and even uncomfortable to wear.

Some phones have recently included speakerphones that are larger speakers designed to output audio signals to be heard though the cellular telephone is not placed against the user's ear. While this does allow the cellular telephone to be used in a speakerphone like fashion, the audio output is shared by others in the vicinity of the cellular telephone. The disadvantage with such an approach is that the user cannot use the cellular in a speakerphone type fashion unless they forego any privacy as to the conversation.

Accordingly, there is a need for improved techniques to utilize wireless communication devices, such as cellular telephones, so that users can participate in conversations with greater ease of use and without a complete loss of privacy.

SUMMARY OF THE INVENTION

The present invention pertains to a directional speaker for a portable electronic device. The directional speaker can be used with the electronic device to direct audio output in a directionally constrained manner. As a result, a certain degree of privacy with respect to the audio output is achieved for the user of the electronic device, yet the user need not wear a headset or ear phone, or have to hold a speaker against one's ear. The directional speaker can be integral with the electronic device. Alternatively, the directional speaker can be an attachment (or peripheral) to the electronic device.

The electronic device can be a computing device, such as a personal computer, a portable computer, or a personal digital assistant. The electronic device can also be a media (e.g., CD or MP#) player, a portable radio, a communications device or an electrical musical instrument. One example of a communications device is a mobile telephone.

The invention can be implemented in numerous ways, including as a method, system, device, apparatus, and a computer readable medium. Several embodiments of the invention are discussed below.

As a personal wireless communication device, one embodiment of the invention includes at least: a microphone for sound pickup; a directional speaker for sound output; and a communication module operatively connected to said microphone and said directional speaker. The communication module supports two-way communications over a wireless channel between said personal wireless communication device and another communication device.

As a peripheral apparatus for an electronic device, one embodiment of the invention includes at least a directional speaker that provides ultrasonic sound output in a predetermined direction. The ultrasonic sound output by said directional speaker results in audio sound in the predetermined direction for a user of the electronic device.

As a peripheral device for a computing device, one embodiment of the invention includes at least a housing and a directional speaker coupled to said housing.

A method for automatically selecting one of a plurality of potential speakers associated with an audio output device, said method comprising: obtaining device condition information pertaining to the audio output device; determining an appropriate one or more of the potential speakers to output an audio output from the audio output device based on the device condition information; and selecting the appropriate one or more of the potential speakers.

Other aspects and advantages of the invention will become apparent from the following detailed description taken in conjunction with the accompanying drawings, which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The present invention pertains to a directional speaker for a portable electronic device. The directional speaker can be used with the electronic device to direct audio output in a directionally constrained manner. As a result, a certain degree of privacy with respect to the audio output is achieved for the user of the electronic device, yet the user need not wear a headset or ear phone, or have to hold a speaker against one's ear. The directional speaker can be integral with the electronic device. Alternatively, the directional speaker can be an attachment (or peripheral) to the electronic device.

The electronic device can be a computing device, such as a personal computer, a portable computer, or a personal digital assistant. The electronic device can also be a media (e.g., CD or MP#) player, a portable radio, a communications device, or an electric musical instrument. One example of a communications device is a mobile telephone, such as a 2G, 2.5G or 3G phone. One example of an electrical musical instrument is an electric piano.

Embodiments of the invention are discussed below with reference to FIGS. 1A-11. However, those skilled in the art will readily appreciate that the detailed description given herein with respect to these figures is for explanatory purposes as the invention extends beyond these limited embodiments.

Figure 1A:
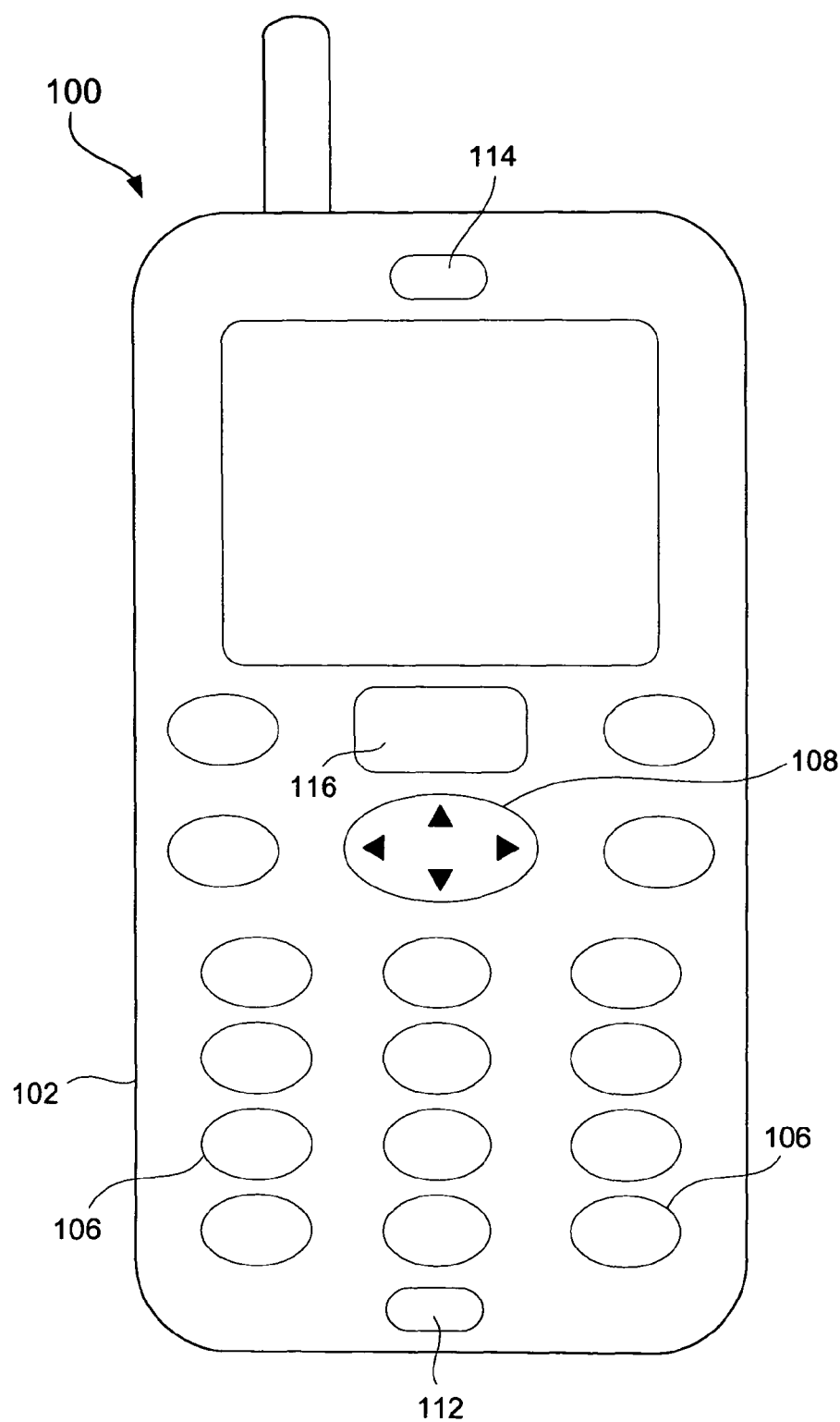
FIG. 1A is a view of a mobile telephone with an integrated directional speaker according to one embodiment of the invention.

FIG. 1A illustrates a mobile telephone 100 with an integrated directional speaker according to one embodiment of the invention. The mobile telephone 100 is, for example, a cellular phone. The mobile telephone 100 includes a housing 102 that provides an overall body for the mobile telephone 100. The mobile telephone 100 includes a display 104. The mobile telephone 100 also includes a plurality of buttons 106 that allow user input of alphanumeric characters or functional requests, and a navigational control 108 that allows directional navigation with respect to the display 104. To support wireless communications, the mobile telephone 100 also includes an antenna 110. In addition, the mobile telephone 100 includes a microphone 112 for voice pickup and an ear speaker 114 for audio output. The ear speaker 114 can also be referred to an earpiece.

Additionally, according to the invention, the mobile telephone 100 also includes a directional speaker 116. The directional speaker 116 provides directional audio sound for the user of the mobile telephone 100. The directional audio sound produced by the directional speaker 116 allows the user of the mobile telephone 100 to hear the audio sound even though neither of the speaker's ears is proximate to the mobile telephone 100. However, the directional nature of the directional sound output is towards the user and thus provides privacy by restricting the audio sound to a confined directional area. In other words, bystanders in the vicinity of the user but not within the confined directional area would not be able to directly hear the audio sound produced by the directional speaker 116. The bystanders might be able to hear a degraded version of the audio sound after it reflects from a surface. The reflected audio sound, if any, that reaches the bystander would be at a reduced decibel level (e.g., at least a 20 dB reduction) making it difficult for bystanders to hear and understand the audio sound.

Figure 1B:
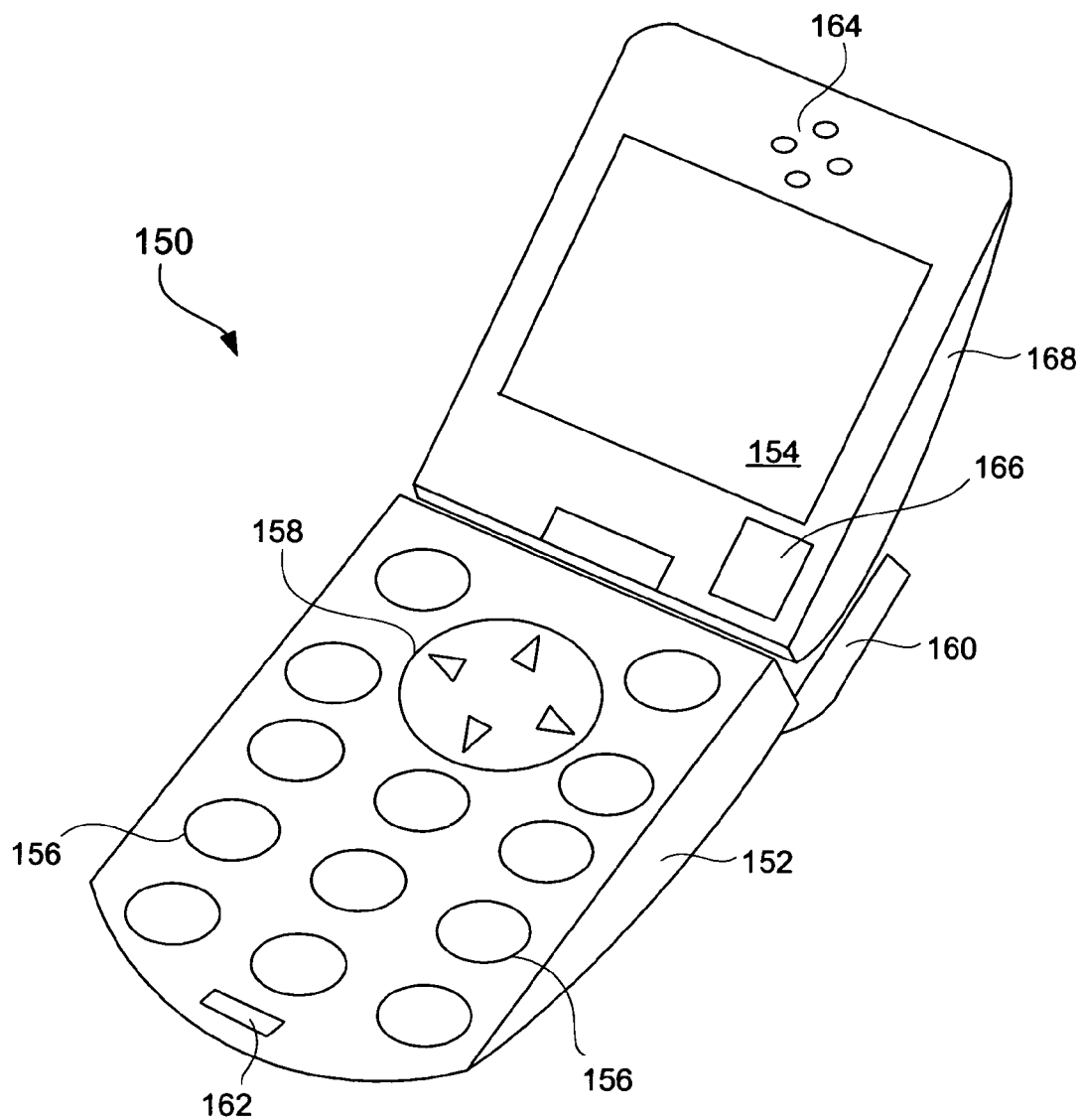
FIG. 1B is a perspective view of a flip-type mobile telephone with an integrated directional speaker according to another embodiment of the invention.

FIG. 1B is a perspective view of a flip-type mobile telephone 150 with an integrated directional speaker according to another embodiment of the invention. The mobile telephone 150 is, for example, a cellular phone. The mobile telephone 150 shown in FIG. 1B is similar to the mobile telephone 100 illustrated in FIG. 1A. More particularly, the mobile telephone 150 includes a housing 152 that provides a body for the mobile telephone 150. The mobile telephone 150 includes a display 154, a plurality of keys 156, and a navigation control 158. To support wireless communications, the mobile telephone 150 also includes an antenna 160. In addition, the mobile telephone 150 includes a microphone 162 for voice pickup and an ear speaker 164 for audio output.

Moreover, according to the invention, the mobile telephone 150 includes a directional speaker 166. In this embodiment, the directional speaker 166 is provided in a lower region of a lid portion 168 of the housing 152 of the mobile telephone 150. The directional speaker 166 directs audio output to the user of the mobile telephone 150 in a directional manner. The directional nature of the directional sound output is towards the user and thus provides privacy by restricting the audio sound to a confined directional area.

The direction for the audio output by the directional speaker 116, 166 can be estimated and thus fixed in advance. Hence, in one embodiment, the directional speakers 116, 166 shown in FIGS. 1A and 1B can be primarily structurally fixed with respect to their directional audio output. For example, the angle and direction can be set such that the directional speaker 116, 166 would output audio in the direction of the user's ears assuming that the user holds the mobile telephone 100, 150 in front of them so as to view information on the display 104, 154.

In other embodiment, the directional speakers 116, 166 can be structurally movable so that a user is able to alter the direction of the directional audio output to suit his needs. The directional speakers 116, 166 can, for example, be repositionable to allow repositioning of the output direction for the directional speakers 116, 166. The directional speakers 116, 166 can, for example, be repositionable by being mounted on a pivot, flexible wire or other rotatable or flexible member.

In yet another embodiment, the mobile telephones 100, 150 include a knob or a switch that electronically controls the direction of the audio output. For example, assume the plurality of keys on the phone 150 shown in FIG. 1B establishes the x-y plane, with x being approximately along the direction of the hinge of the phone. By turning the knob, a user can adjust the output direction of the audio signals from the directional speaker 166 in the y-z plane.

Furthermore, the placement of directional speaker 116, 166 with respect to its housing 102, 152, respectively, can vary with implementation. Typically, however, the placement is designed to facilitate directing the output audio in the direction of a person that is to hear the audio sounds. In any case, the placement of the directional speaker 116 with respect to the housing 102 shown in FIG. 1A and placement of the directional speaker 166 with respect to the housing 152 shown in FIG. 1B are merely representative placements, as various other placement are possible. For example, a directional speaker could be placed near the ear speaker, near the display, on the outer or back surface of the housing, etc.

Figure 2:
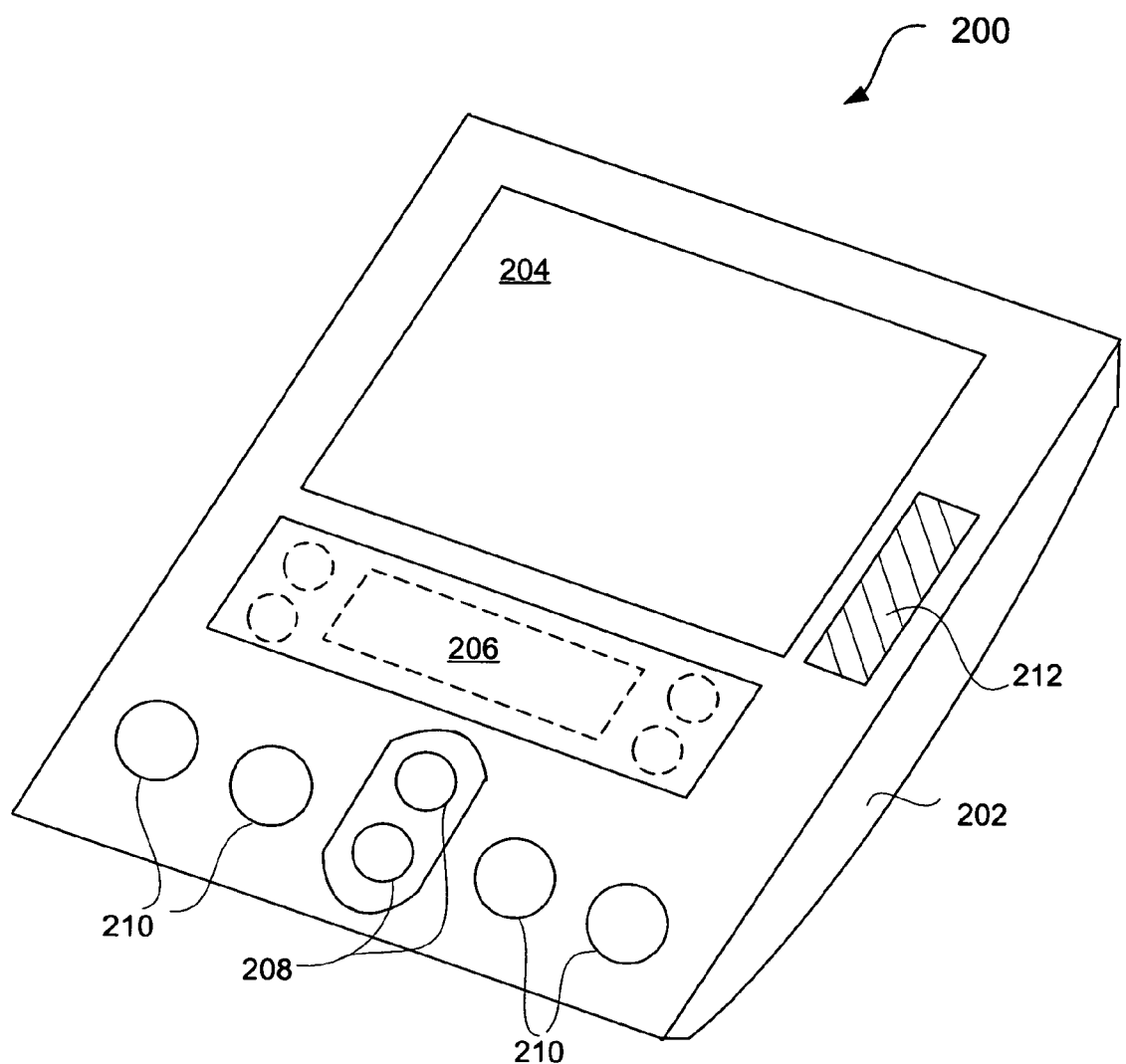
FIG. 2 is a perspective view of a personal digital assistant with an integrated directional speaker according to one embodiment of the invention.

FIG. 2 is a perspective view of a personal digital assistant 200 with an integrated directional speaker according to one embodiment of the invention. The personal digital assistant 200 includes a housing 202 that provides a body for the personal digital assistant 200. The personal digital assistant 200 includes a display 204, an input pad 206, navigation buttons 208, and other buttons 210. The display 204 presents information to be viewed by the user of the personal digital assistant 200. The input pad 206, for example, allows user to select soft buttons or enter characters through gestures. The navigation buttons 208 allow a user to interact with information displayed by the display 204. The buttons 210 can provide various functions, such as initiating a particular operation, data entry, or item selection.

Still further, the personal digital assistant 200 includes a directional speaker 212. The directional speaker 212 provides directional audio output for the user of the personal digital assistant 200. The audio output by the directional speaker 212 is not only directed in a predetermined direction but also substantially confined to that predetermined direction. As a result, the audio output by the directional speaker 212 is not easily heard by others but the user of the personal digital assistant 200.

The positioning of the directional speaker 212 can be fixed or adjustable, as noted above with respect to FIGS. 1A and 1B. If adjustable, the direction of the audio output is able to be altered. Still further, the placement of the directional speaker 212 shown in FIG. 2 is one possible embodiment; therefore, it should be recognized that the directional speaker 212 can be positioned in any of a wide variety of places on the personal digital assistant 200. However, in preferred embodiments, the directional speaker 212 is placed on the front side of the housing 202.

The personal digital assistant 200 may or may not have wireless communication capabilities. However, if the personal digital assistant 200 does have wireless communication capabilities, the personal digital assistant 200 may also include one or more of a microphone and a traditional speaker. In yet another embodiment, the personal digital assistant 200 also includes a camera. If the personal digital assistant 200 has these components, then the user of the personal digital assistant 200 can, for example, use the personal digital assistant 200 as a video phone or participate in video conferences using the personal digital assistant 200. By using the directional speaker 212 instead of a traditional speaker, the audio output from the personal digital assistant 200 can be directed primarily to the user of the personal digital assistant 200. Hence, the audio output enjoys a certain level of privacy without requiring the user of the personal digital assistant 200 to hold the personal digital assistant 200 to her ear or to wear a headset. As a result, the user of the personal digital assist 200 would be able to view the display 204 while also listening to audio output in a relatively private manner.

Figure 3:
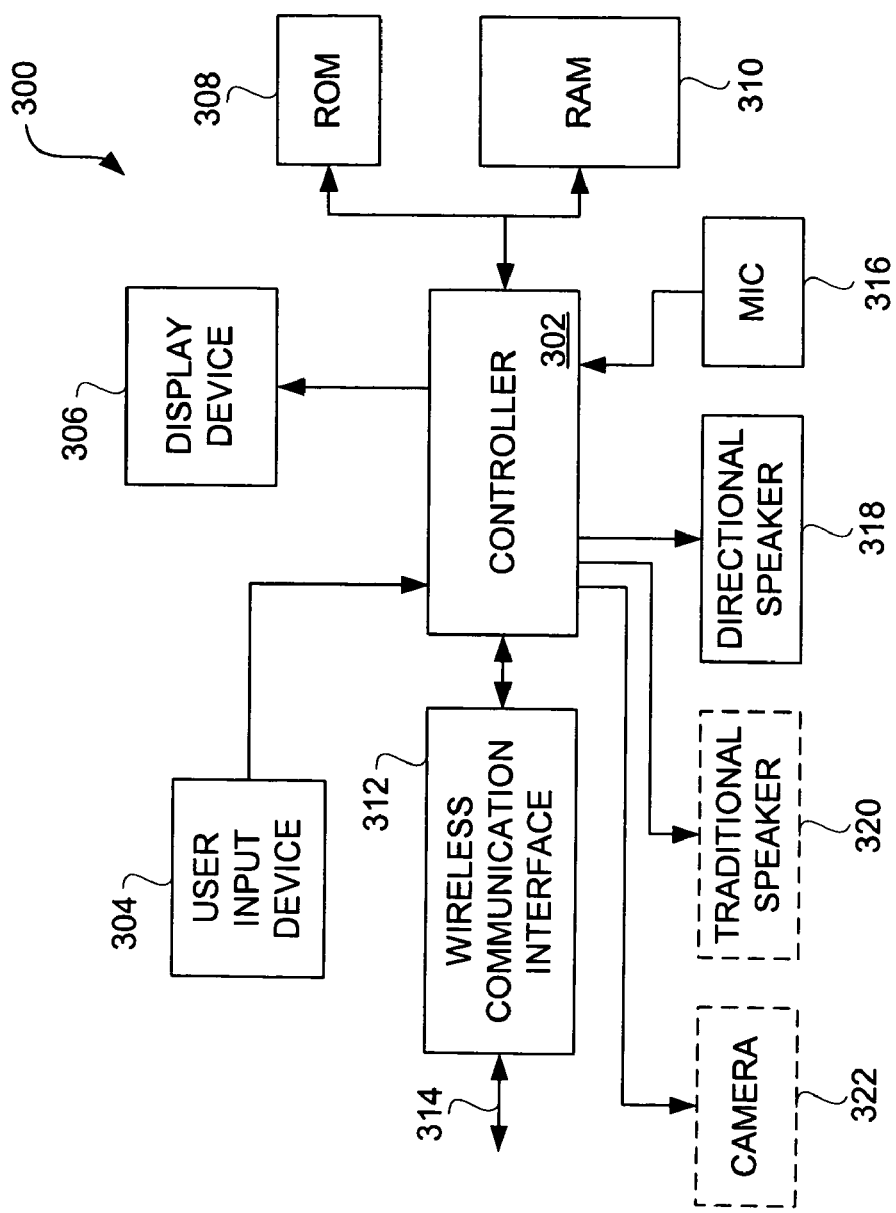
FIG. 3 is a block diagram of an electronic device with wireless communication capability according to one embodiment of the invention.

FIG. 3 is a block diagram of a wireless communication device 300 according to one embodiment of the invention. The wireless communication device 300 is, more generally, an electronic device with wireless communication capability. The wireless communication device 300 can, for example, represent the mobile telephone 100 shown in FIG. 1A, the mobile telephone 150 shown in FIG. 1B, or the personal digital assistant 200 shown in FIG. 2 (with such supporting wireless communication circuitry).

The wireless communication device 300 includes a controller 302 that controls overall operation for the wireless communication device 300. A user input device 304 can represent one or more buttons or a keypad that enables the user to interact with the wireless communication device 300. A display device 306 allows the controller 302 to visually present information to the user of the wireless communication device 300. The controller 302 also couples to read-only memory (ROM) 308 and random access memory (RAM) 310. The wireless communication device 300 also includes a wireless communication interface 312 that enables the wireless communication device 300 to couple to a wireless link 314 so that information can be transmitted between the wireless communication device 300 and another communication device.

The wireless communication device 300 also includes a microphone 316 and a directional speaker 318. The microphone 316 may be designed to pickup incoming audio signals with respect to a particular direction. The directional speaker 318 is specifically designed to output audio sound in a confined direction. In one embodiment, the directional speaker 318 outputs ultrasonic sound that becomes audio sound so that a user of the wireless communication device 300 can hear the audio output. However, by using the directional speaker 318, other persons (besides the user) in the vicinity of the wireless communication device 300 would have difficulty hearing the audio output produced by the wireless communication device 300.

Still further, the wireless communication device 300 can also include a traditional speaker 320 and a camera 322. The traditional speaker 320 can be used when the user of the wireless communication device 300 is not concerned about privacy, desires others to hear the audio output, or is holding the device right next to one of her ears. The camera 322 can allow the wireless communication device 300 to transmit video (or at least still images) to other devices over the wireless link 314.

As shown in FIG. 3, the microphone 316, the directional speaker 318, the traditional speaker 320 or the camera 322, to the extent provided, are a part of or integral to the wireless communication device 300. However, it should be recognized that any of the microphone 316, the directional speaker 318, the traditional speaker 320 or the camera 322 could be provided external to the wireless communication device 300 and coupled thereto in a wired or wireless manner.

Figure 4A:
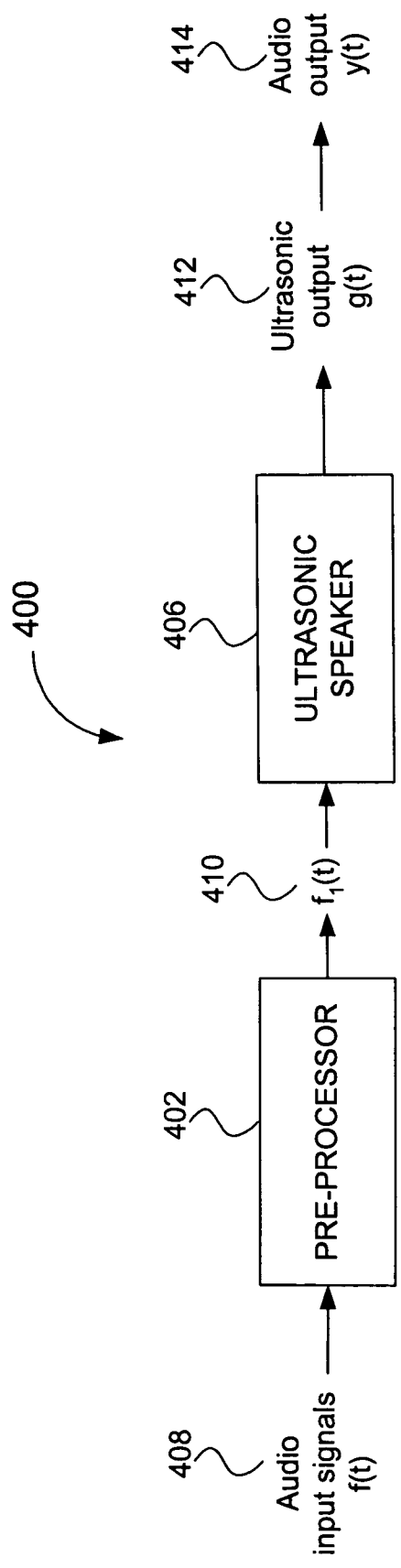
FIG. 4A is a block diagram of a directional audio conversion apparatus according to one embodiment of the invention.

FIG. 4A is a block diagram of a directional audio conversion apparatus 400 according to one embodiment of the invention. The directional audio conversion apparatus 400 transforms audio input signals into directional audio output signals. The directional audio conversion apparatus 400 includes a pre-processor 402 and an ultrasonic speaker 406. The pre-processor 402 can be implemented by hardware or software. In one embodiment, at least a portion of the pre-processor 402 can be internal to and thus part of the controller 302 shown in FIG. 3. In another embodiment, the pre-processor 402 can be separate circuitry, either within or external to the wireless communication device 300. The separate circuitry can be an integrated circuit.

The ultrasonic speaker 406 is one type of directional speaker (e.g., the directional speaker 318). The pre-processor 402 receives audio input signals 408, and converts the audio input signals 408 into ultrasonic drive signals 410. The ultrasonic drive signals 410 are supplied to the ultrasonic speaker 406 to generate ultrasonic output 412. The ultrasonic output 412 is subsequently transformed, for example, by air to audio output 414. Typically, it is desirable to make the frequency spectrum of the audio output 414 as similar to the audio input 408 as possible. However, in some situations, it may be desirable to alter the frequency spectrum of the audio output 414 (as compared to the audio input 408) to provide enhanced hearing or to adapt to environmental or location-based characteristics.

In one embodiment, to represent the different operations of the audio conversion apparatus 400 mathematically, assume that the audio input is represented by f(t), the ultrasonic carrier signals by $\omega_c t$, the drive signals by $f_1(t)$, the impulse response of the ultrasonic speaker or transducer by h(t), the ultrasonic output by g(t), and the audio output by y(t). Then, $(\iint f(t)\ dt^2)^{1/2} * \cos \omega_c t$, represents one embodiment of pre-processing operations by the pre-processor to generate $f_1(t)$. This can be known as the basic pre-processing performed by a basic pre-processing circuit. Further, $f_1(t) \otimes h(t)$, represents the operation performed by the ultrasonic speaker to generate g(t), with the symbol $\otimes$ denoting signal convolution operations. Finally, $\partial^2/\partial t^2 [g^2(t)]$, represents self-demodulation of the ultrasonic output g(t) by air to generate the audio output y(t).

The pre-processor can further perform a number of additional operations to modify the drive signals 410 before feeding them to the speaker. Typically, one objective of such additional pre-processing is to make the frequency spectrum of the audio output signals 414 to be as similar to that of the audio input 408 as possible. However, in some situations, it may an objective of such additional pre-processing to alter the frequency spectrum of the audio output 414 (as compared to the audio input 408) to provide enhanced hearing or to adapt to environmental or location-based characteristics.

Figure 4B:
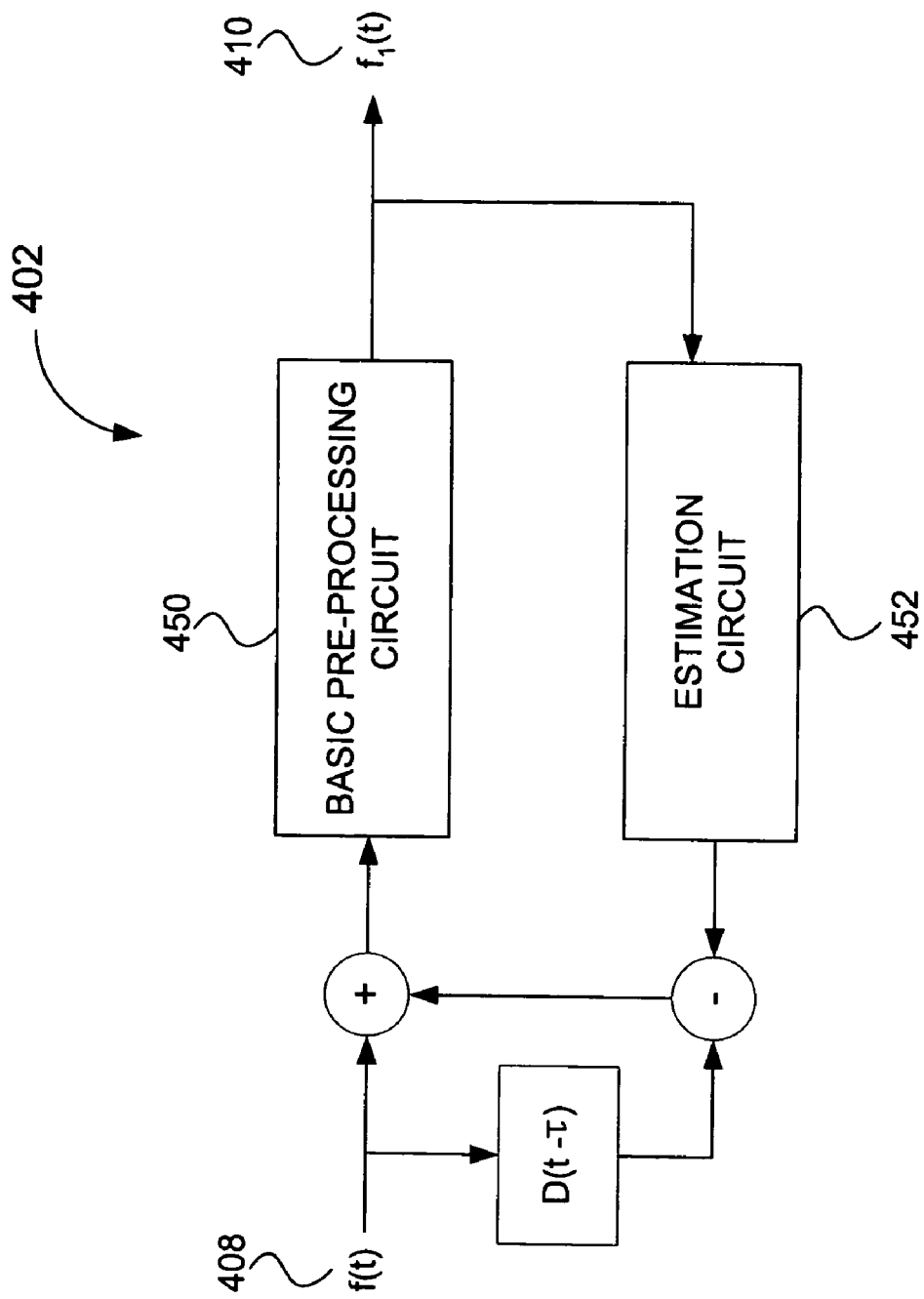
FIG. 4B is a block diagram of a pre-processor according to one embodiment of the invention.

FIG. 4B is a block diagram of the pre-processor 402 according to one embodiment of the invention. The pre-processor 402, in this embodiment, includes a basic pre-processing circuit 450 and an estimation circuit 452. The estimation circuit 452 in a feedback loop formed by the basic pre-processing circuit 450. In FIG. 4B, D(t−Γ) represents delaying the audio input 408 by Γ, which is the total loop delay.

Figure 4C:
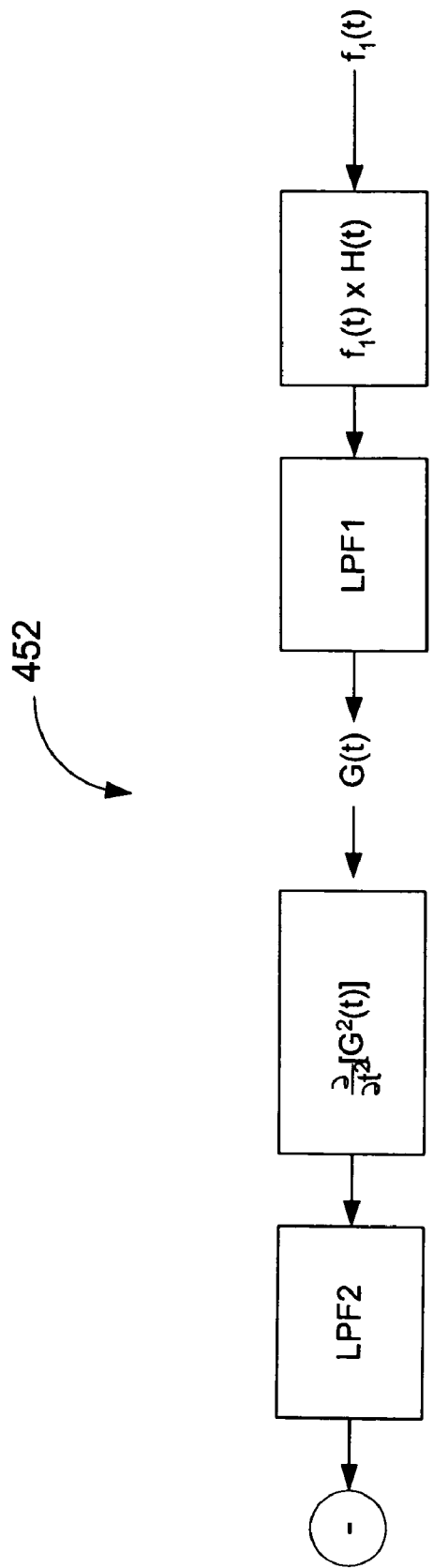
FIG. 4C is a block diagram of an estimation circuit for a pre-processor according to one embodiment of the invention.

FIG. 4C is a block diagram of the estimation circuit 452 according to one embodiment of the invention. In this example, H(t) represents the estimated impulse response of the ultrasonic speaker, and G(t) represents the estimated ultrasonic output, both subject to finite transmission bandwidth of the system. LPF1 and LPF2 represent low-pass filter 1 and low-pass filter 2, respectively.

The basic pre-processing circuit 450 can be of different embodiments. Assume F(t) represents the audio input f(t), shifted by 90 degrees. For an amplitude modulated signal pre-processing scheme, various embodiments for the basic pre-processing circuit 450 can perform any one of the following operations:

$(1+m*f(t))*\cos \omega_c t$, for double side band with large carrier;

$f(t)*\cos \omega_c t$, for double side band suppressed carrier;

$(1+m*f(t))*\cos \omega_c t - m*F(t)*\sin \omega_c t$, for single side band large carrier;

$f(t)*\cos \omega_c t - F(t)*\sin \omega_c t$, for single side band suppressed carrier;

$(1+m*f(t))^{1/2}*\cos \omega_c t$, for modified amplitude modulation; and $(e(t)+m*f(t))^{1/2}*\cos \omega_c t$, for envelope modulation, where e(t)=LPF (f(t)), or the envelope of f(t).

For a phase modulated signal pre-processing scheme, various embodiments for the basic pre-processing circuit 450 can perform any one of the following operations:

$\cos \omega_c t + \cos \omega_c t + \iint f(t)\ dt^2)$, for phase modulation with carrier; and $\cos (\omega_c t + \iint f(t)\ dt^2)$, for phase modulation with suppressed carrier.

Figure 5:
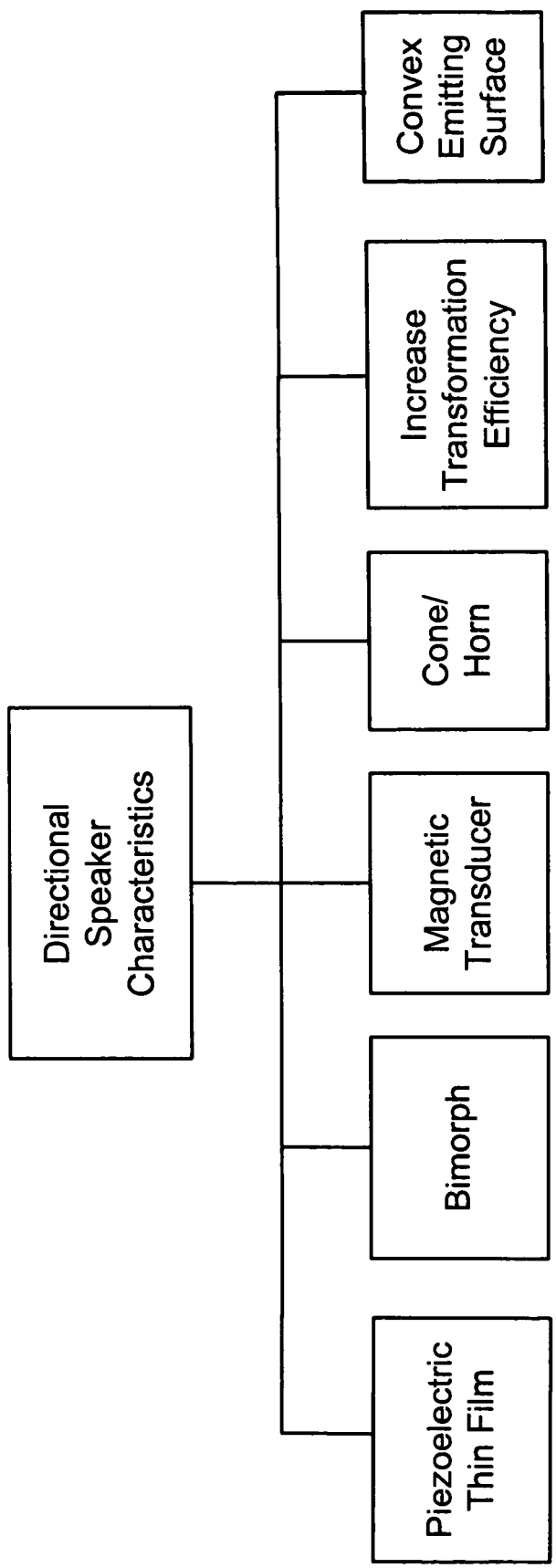
FIG. 5 illustrates different embodiments of directional speaker characteristics according to the invention.

FIG. 5 illustrates different embodiments of directional speaker characteristics according to the present invention. The directional speaker can, for example, be any of the directional speakers 116, 166, 212, 318 and 406 illustrated in FIGS. 1A, 1B, 2, 3 and 4A respectively.

According to one embodiment, the directional speaker can be implemented using a piezoelectric thin film. The piezoelectric thin film can be deposited on a plate with many cylindrical tubes. An example of such a device is described in U.S. Pat. No. 6,011,855, which is hereby incorporated by reference. The film can be a polyvinylidiene di-fluoride (PVDF) film, and can be biased by metal electrodes. The film can be attached or glued to the perimeter of the plate of tubes. The total emitting surfaces of all of the tubes can have a dimension in the order of a few wavelengths of the carrier or ultrasonic output. Appropriate voltages applied through the electrodes to the piezoelectric thin film create vibrations of the thin film to generate the modulated ultrasonic output. The vibrations cause resonance of the enclosed tubes. After emitted from the film, the ultrasonic output self-demodulate through non-linear mixing in air to produce the audio output.

As one example, the piezoelectric film can be about 28 microns in thickness; and the tubes can be 9/64 inches in diameter and spaced apart by 0.16 inches, from center to center of the tube, to create a resonating frequency of around 40 KHz. With the ultrasonic output being centered around 40 KHz, the emitting surface of the directional speaker can be around 2 cm by 2 cm. A significant percentage of the power of the ultrasonic/audio output generated by the emitting surface of the directional speaker can, in effect, be confined in a cone (virtual or physical).

To calculate the amount of ultrasonic power within the cone, for example, as a rough estimation, assume that (a) the emitting surface is a uniform circular aperture with the diameter of 2.8 cm, (b) the wavelength of the ultrasonic signals is 8.7 mm, and (c) all power goes to the forward hemisphere. Then the power contained within the Full Width Half Mass (FWHM) of the main lobe is about 97%, and the power contained from null to null of the main lobe is about 97.36%. Similarly, again as a rough estimation, if the diameter of the aperture drops to 1 cm, the power contained within the FWHM of the main lobe is about 97.2%, and the power contained from null to null of the main lobe is about 99%.

Referring back to the example of the piezoelectric film, the FWHM of the signal beam is about 24 degrees. Assume that such a directional speaker is held by the user, such as in front of the user in one of the user's hands. The output from the speaker can be directed in the anticipated direction of the user's head, with the distance between the hand and the head being, for example, 10-30 inches. More than 75% of the power of the audio output generated by the emitting surface of the directional speaker is, in effect, confined in a virtual cone. The tip of the cone is at the speaker, and the mouth of the cone is at the location of the user's head. For example, the diameter of the mouth of the cone, or the diameter of the cone in the vicinity of the user's, can be about 4 to 12 inches.

In another embodiment, the ultrasonic frequency is at 100 KHz, with convex surfaces to expand the beam (described below). The emitting surface of the directional speaker is around 5 cm by 1 cm.

In yet another embodiment, the directional speaker can be made of a bimorph piezoelectric transducer. The transducer can, for example, have a physical cone of about 1 cm in diameter. In yet another embodiment, the directional speaker can be a magnetic transducer. In a further embodiment, the directional speaker does not generate ultrasonic output but generates audio output directly, and the speaker includes, for example, a physical horn or cone to direct the audio output.

In yet another embodiment, the power output from the directional speaker is increased by increasing the transformation efficiency (e.g., demodulation or mixing efficiency) of the ultrasonic signals. According to the Berktay's formula, as disclosed, for example, in "Possible exploitation of Non-Linear Acoustics in Underwater Transmitting Applications," by H. O. Berktay, in J. Sound Vib., Vol. 2 (4):435-461 (1965), output audio power is proportional to the coefficient of non-linearity of the mixing or demodulation medium.

In one embodiment, the direction of the audio output from the directional speaker can be adjusted electronically or manually. One approach is to attach the speaker to a base that can be rotated electronically or manually. The orientation of the base can be set by turning a knob on, for example, the phone 150. In another embodiment, the speaker is composed of a number of directional speaker components or a number of directional speakers. The phase among the signals from the directional speakers or directional speaker components can be modified to adjust the direction of the resultant beam. This is similar to techniques used in a phase-array antenna to adjust the direction of the beam.

In another embodiment, the directional speaker can make use of a curved emitting surface (e.g., convex emitting surface) or a curved reflector. The curved emitting surface or reflector enables the width of the beam to be increased.

Figure 6:
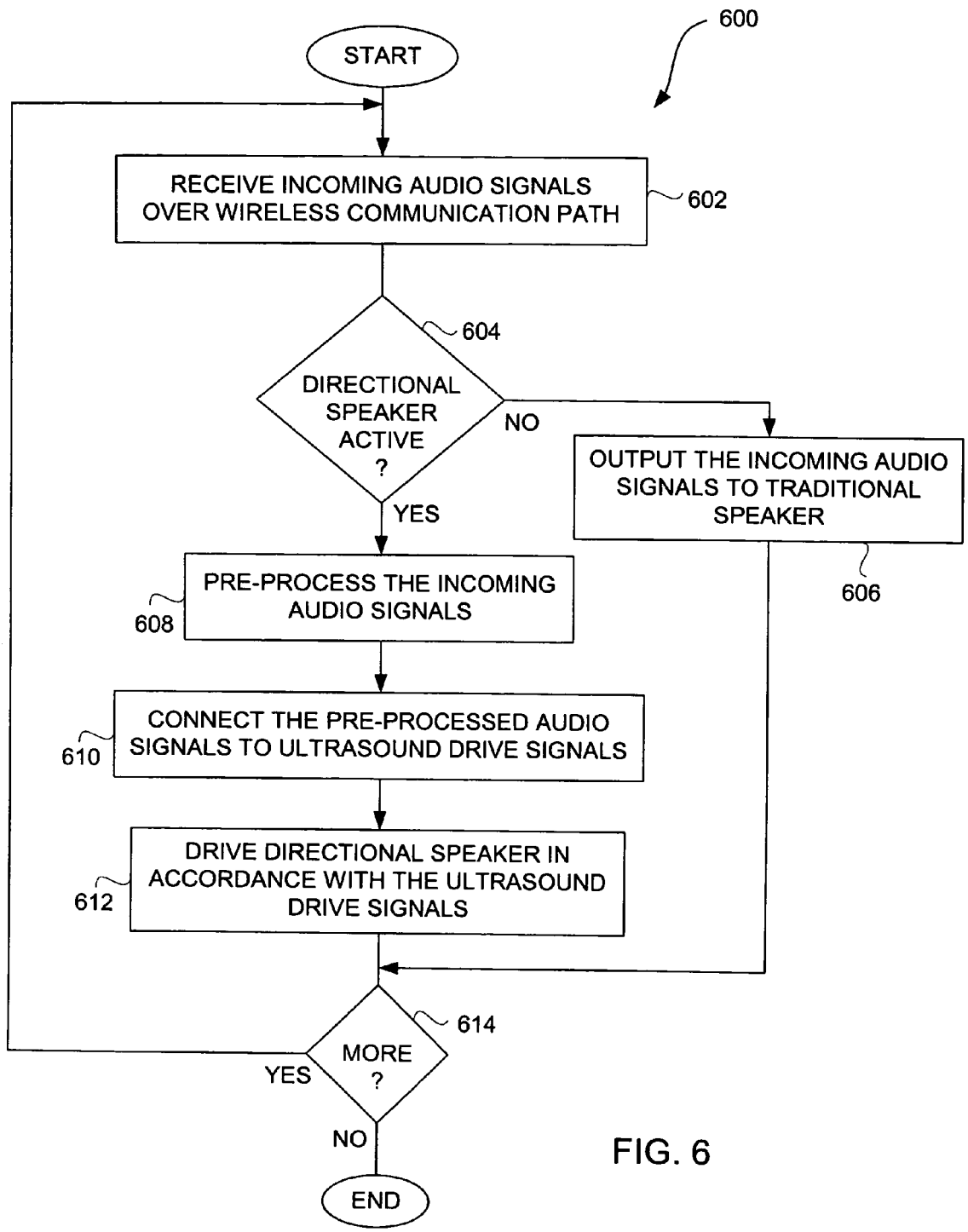
FIG. 6 is a flow diagram of audio signal processing according to one embodiment of the invention.

FIG. 6 is a flow diagram of audio signal processing 600 according to one embodiment of the invention. Here, it is assumed that the wireless communication device contains not only a directional speaker but also a traditional speaker (e.g., ear speaker). The audio signal processing 600 is, for example, performed by a wireless communication device. As an example, the controller 302 of the wireless communication device 300 illustrated in FIG. 3 can perform the audio signal processing 600.

The wireless communication device can be a mobile telephone. Such a mobile telephone can have dual modes of operation, namely, a normal or traditional mode, and a two-way or directional-speaker mode. In a normal-mode, the audio sound is produced directly from a traditional (or standard) speaker (e.g., an ear speaker integral with the mobile telephone (e.g., within its housing). Such a speaker is substantially non-directional (and further does not generate audio sound through transforming ultrasonic signals in air). In the two-way mode, the audio sound is produced by a directional speaker. In the two-way mode, the mobile telephone is, for example, operating as a walkie-talkie, a dispatch type communicator, or a video phone.

The mobile telephone may also have a speakerphone mode in which audio output is produced by a speaker that allows those in the vicinity of the mobile telephone to hear the audio output. The speaker in this case is more powerful than the ear speaker but also substantially non-directional. Mode selection, whether manual or automatic, can also be used to select a speakerphone mode.

Referring back to FIG. 6, the audio signal processing 600 initially receives 602 incoming audio signals over a wireless communication path. Next, a decision 604 determines whether a directional speaker is active. When the decision 604 determines that the directional speaker is not active, then the incoming audio signals are output 606 to the traditional speaker of the wireless communication device. When the wireless communication device is a mobile telephone, the traditional speaker is, for example, an ear speaker (earpiece). On the other hand, when the wireless communication device is a personal digital assistant or portable computer, the traditional speaker could simply be a standard audio speaker.

On the other hand, when the decision 604 determines that the directional speaker is active, then the incoming audio signals can be pre-processed 608. As an example, the pre-processing can utilize the techniques described under FIGS. 4A-C. After the incoming audio signals are pre-processed 608, the pre-processed signals are converted 610 to ultrasound drive signals. Then, the directional speaker is driven 612 in accordance with the ultrasound drive signals.

Following the operations 606 and 612, a decision 614 determines whether there are more incoming audio signals to be processed at this time. When the decision 604 determines that there are more incoming audio signals to be processed, then the audio signal processing 600 returns to repeat the operation 602 and subsequent operations so that the additional incoming audio signals can be similarly processed. Alternatively, when the decision 614 determines that there are no more audio signals to be processed at this time, then the audio signal processing 600 is complete and ends.

Other than the operations 604 and 606 (which are not necessary when speaker selection is not available), the directional audio conversion apparatus 400 illustrated in FIG. 4A can also perform the audio signal processing 600.

Figure 7:
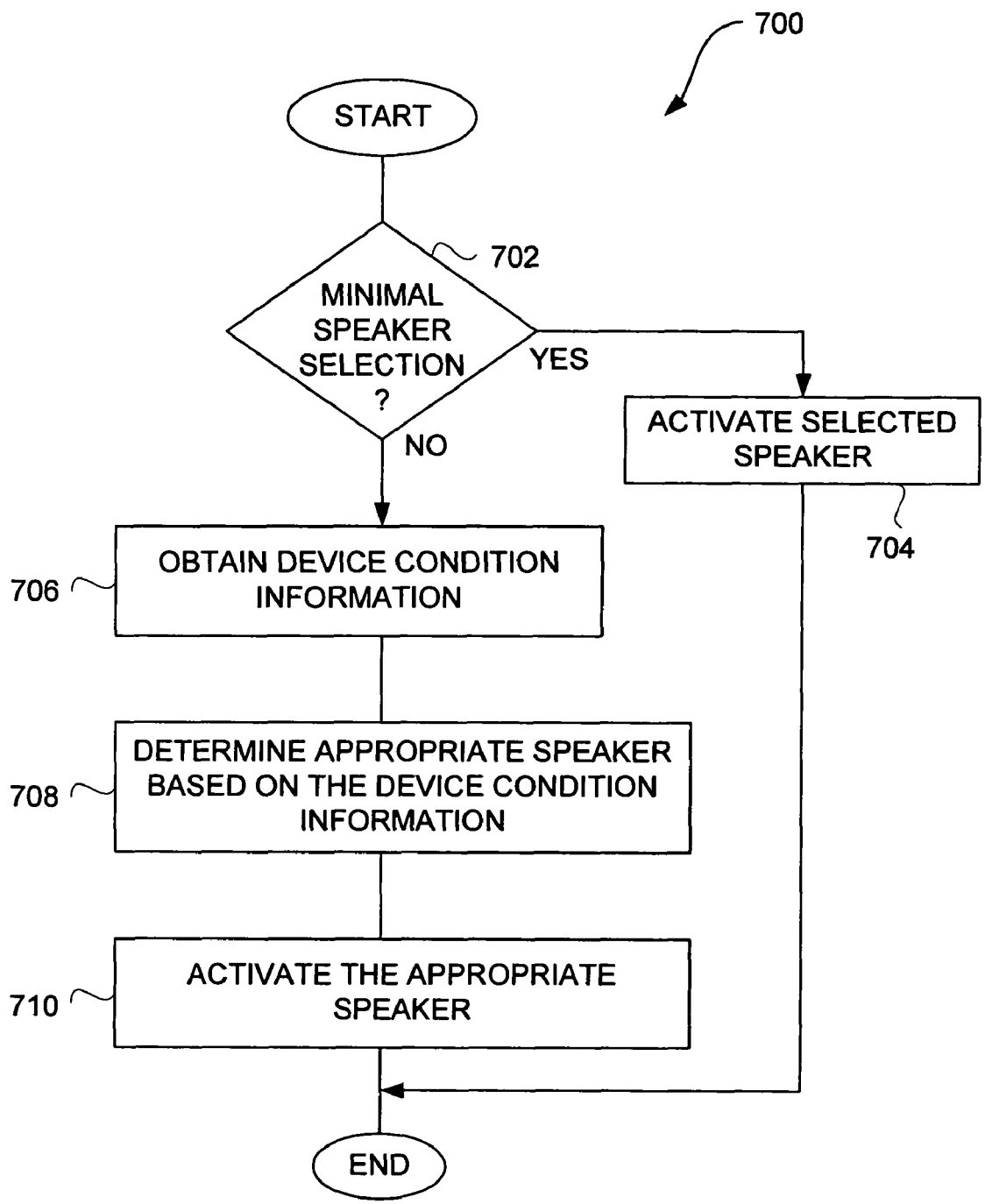
FIG. 7 is a flow diagram of speaker selection processing according to one embodiment of the invention.

FIG. 7 is a flow diagram of speaker selection processing 700 according to one embodiment of the invention. The speaker selection processing 700 is, for example, performed by a wireless communication device. As an example, the controller 302 of the wireless communication device 300 illustrated in FIG. 3 can perform the speaker selection processing 700.

The speaker selection processing 700 begins with a decision 702 that determines whether a manual speaker selection has been made. When the decision 702 determines that a manual speaker selection has been made, then the selected speaker is activated 704 in accordance with the manual request. The manual speaker selection can, for example, be made by a user in a variety of ways, such as by (a) a button on the device, (b) a user selection with respect to a user interface presented on a display, (c) a sensor in accordance with certain sensing conditions, or (d) other means.

On the other hand, when the decision 702 determines that a manual speaker selection has not been made, then device condition information is obtained 706. The device condition information can result from one or more sensors integral or coupled to the device. The appropriate speaker to be selected is then determined 708 based upon the device condition information. For example, if the wireless communication device was placed against the user's ear, then a sensor could detect (e.g., estimate) such placement and, as a result, use an earpiece type speaker. On the other hand, if the device is determined (e.g., estimated) to be at least a certain distance away from an object (such as the user's head or ear), then the directional speaker can be utilized. In any case, the appropriate speaker is then activated 710. Following the operation 704 or 710, the selection processing 700 is complete and ends.

Figure 8:
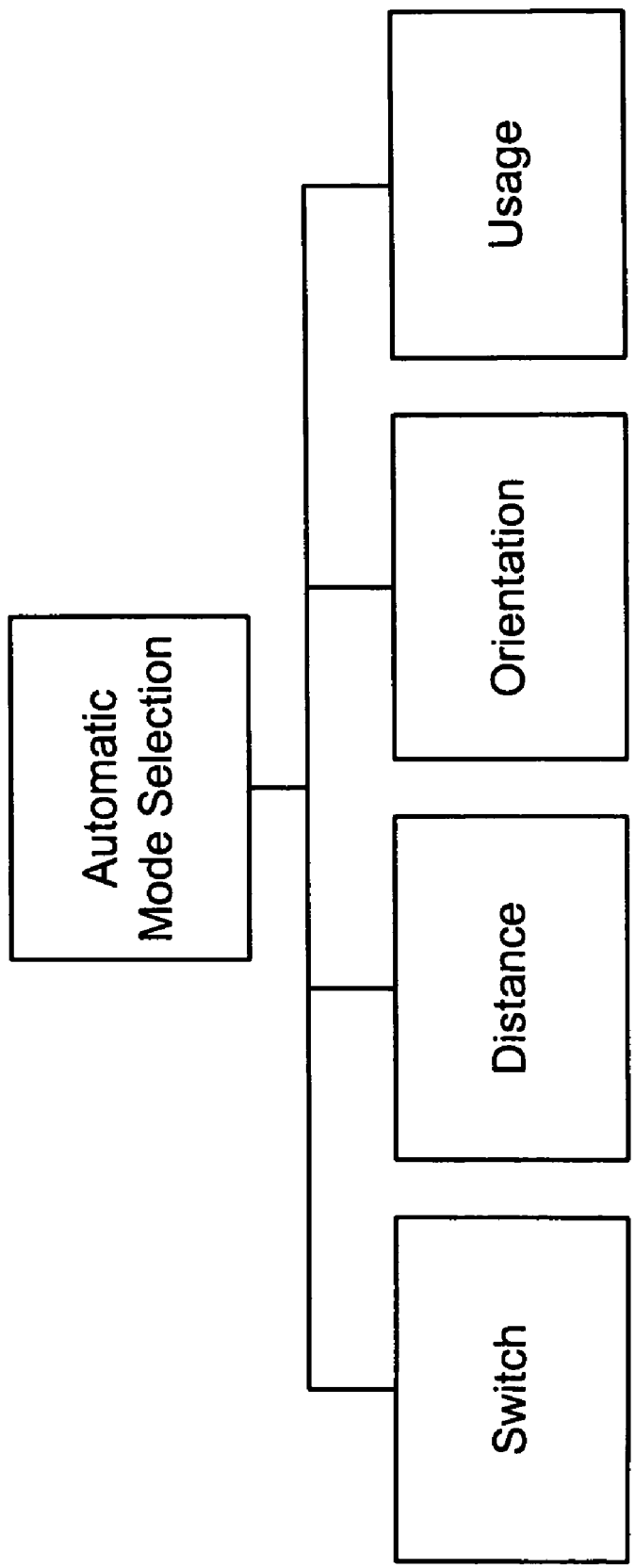
FIG. 8 is a diagram indicating exemplary conditions that can be utilized to select the appropriate speaker.

FIG. 8 is a diagram indicating exemplary conditions that can be utilized to select the appropriate speaker. The speaker selection processing 700 and the exemplary conditions shown in FIG. 8 assume that the wireless communication device has multiple speakers to be selected from, and at least one of which is a directional speaker and at least another of which a traditional speaker.

Assume again that the wireless communication device is a mobile phone. The mode selection between the normal or traditional mode, and the two-way or directional-speaker mode can be achieved manually or automatically. FIG. 8 shows examples of different techniques to select the mode for the mobile telephone. In one embodiment, mode selection can be achieved through a switch integrated to the mobile telephone. The switch can be electrical, mechanical or electro-mechanical. For example, a mechanical switch can be located right next to the traditional speaker. When the traditional speaker is against the user's ear, the switch will be pressed and the traditional speaker will be activated.

In another example, mode selection can be determined based on a distance. The mobile telephone can include a sensor to sense the distance the mobile telephone (e.g., its ear speaker region) is from a surface. For example, such a sensor can use a light beam (e.g., infrared beam) to sense the distance. When the distance is very short, then the normal mode can be automatically selected, and when the distance is greater than the short distance, then the mobile telephone is deemed not against the user's ear, so the two-way mode is automatically selected. One way to detect distance based on infrared beam is to measure the intensity of reflected beam. If the reflecting surface is very close to the infrared source, the intensity of the reflected beam would be high. However, if the reflecting surface is 12" or more away, the intensity would be relatively much lower. As a result, by measuring the intensity of the reflected beam, distances can be inferred.

In yet another example, mode selection can be based on orientation. If the mobile telephone is substantially in a vertical orientation (e.g., within 45 degrees from the vertical), the mobile telephone will operate in the two-way mode. However, if the mobile telephone is substantially in a horizontal orientation (e.g., within 30 degrees from the horizontal), the mobile telephone will operate in the normal mode. A gyro (gyroscope) in the mobile telephone can be used to determine the orientation of the mobile telephone. In still another example, mode selection can be based on usage. For example, if the mobile telephone is receiving user input via its integral keypad, acting as a video phone, or playing a video, then the mobile telephone can be set to operate in the two-way mode.

Figure 9A:
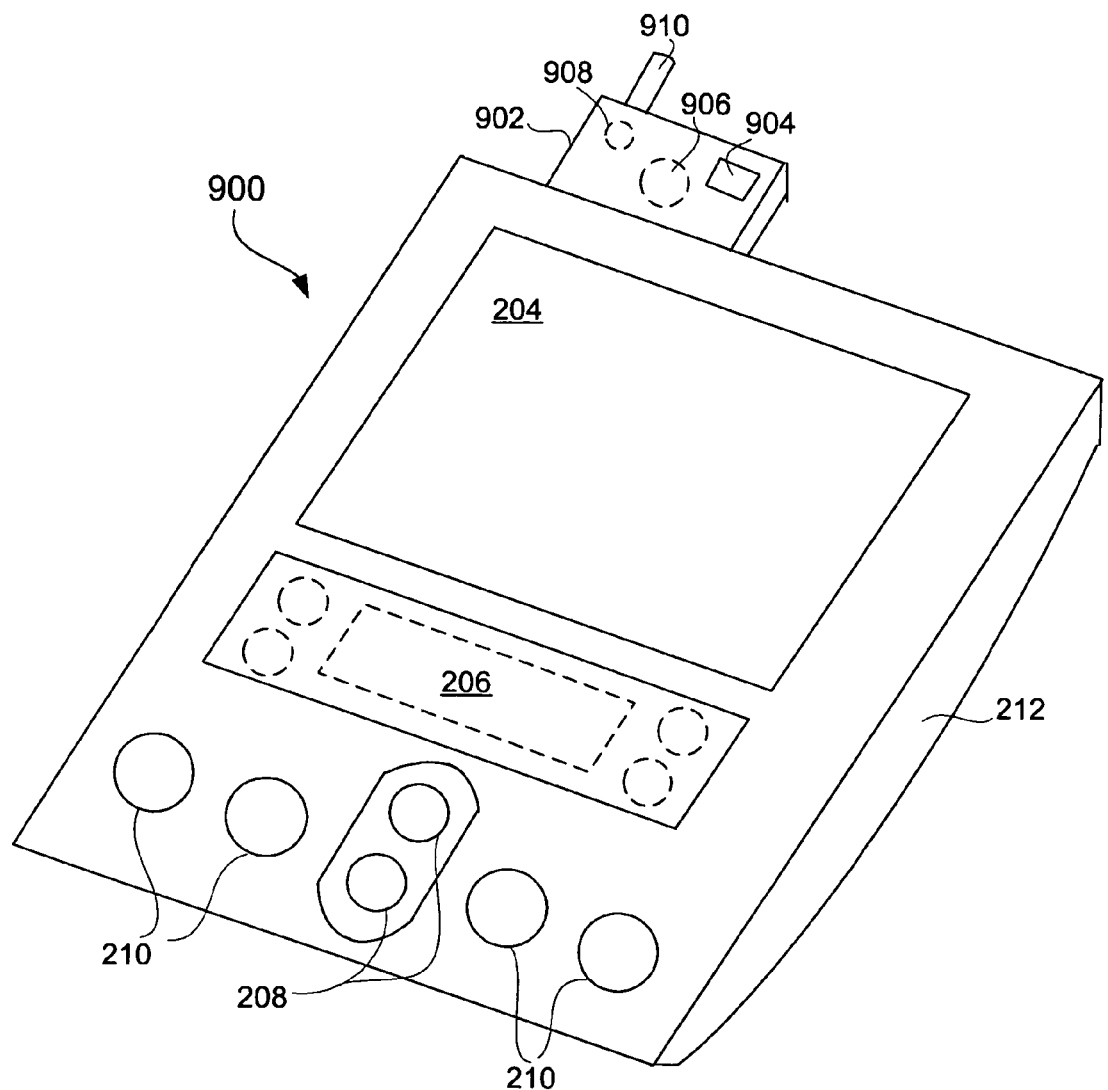
FIG. 9A is a perspective view of a personal digital assistant with an attachable directional speaker according to another embodiment of the invention.

FIG. 9A is a perspective view of a personal digital assistant 900 according to another embodiment of the invention. The personal digital assistant 900 is generally similar to the personal digital assistant 200 shown in FIG. 2. However, the personal digital assistant 900 further includes a card 902 that is inserted into a card slot of the personal digital assistant 900.

The card 902 is an add-on card that provides wireless communication capabilities as well as audio and video capabilities for the personal digital assistant 900. More particularly, the card 902 includes a directional speaker 904, a camera 906, a microphone 908 and an antenna 910. The directional speaker 904 provides confined audio output in a particular direction as noted above with respect to other embodiments. The camera 906 provides video input capabilities to the personal digital assistant 900. The microphone 908 allows audio input. The antenna 910 is used for wireless communications. Hence, the card 902 allows the personal digital assistant 900, that otherwise does not support wireless communication or audio-video features, to operate as a video phone or participate in video conferences. In this regard, the user's audio output (voice) can be picked up by the microphone 908, and the user's face or other desired picture or video can be acquired by the camera 906. The user of the personal digital assistant 900 can then hear incoming audio by way of the directional speaker 904, which through its directional characteristics provides a certain degree of privacy to the user. Further, video input can be displayed on the display 204 for the benefit of the user.

The card 902 can include circuitry within the housing of the card 902 to support the functionality offered by the card 902. The circuitry can pertain to various discrete electronic devices and/or integrated circuits. The circuitry can thus supplement the circuitry of the personal digital assistant 900.

Although the card 902 includes wireless communication capabilities, a microphone, a directional speaker and a camera, it should be understood that other cards that can be used in a similar manner need not support each of these items. For example, in one embodiment, the add-on card could simply pertain to a directional speaker 904 and its associated circuitry (e.g., audio conversion apparatus).

Figure 9B:
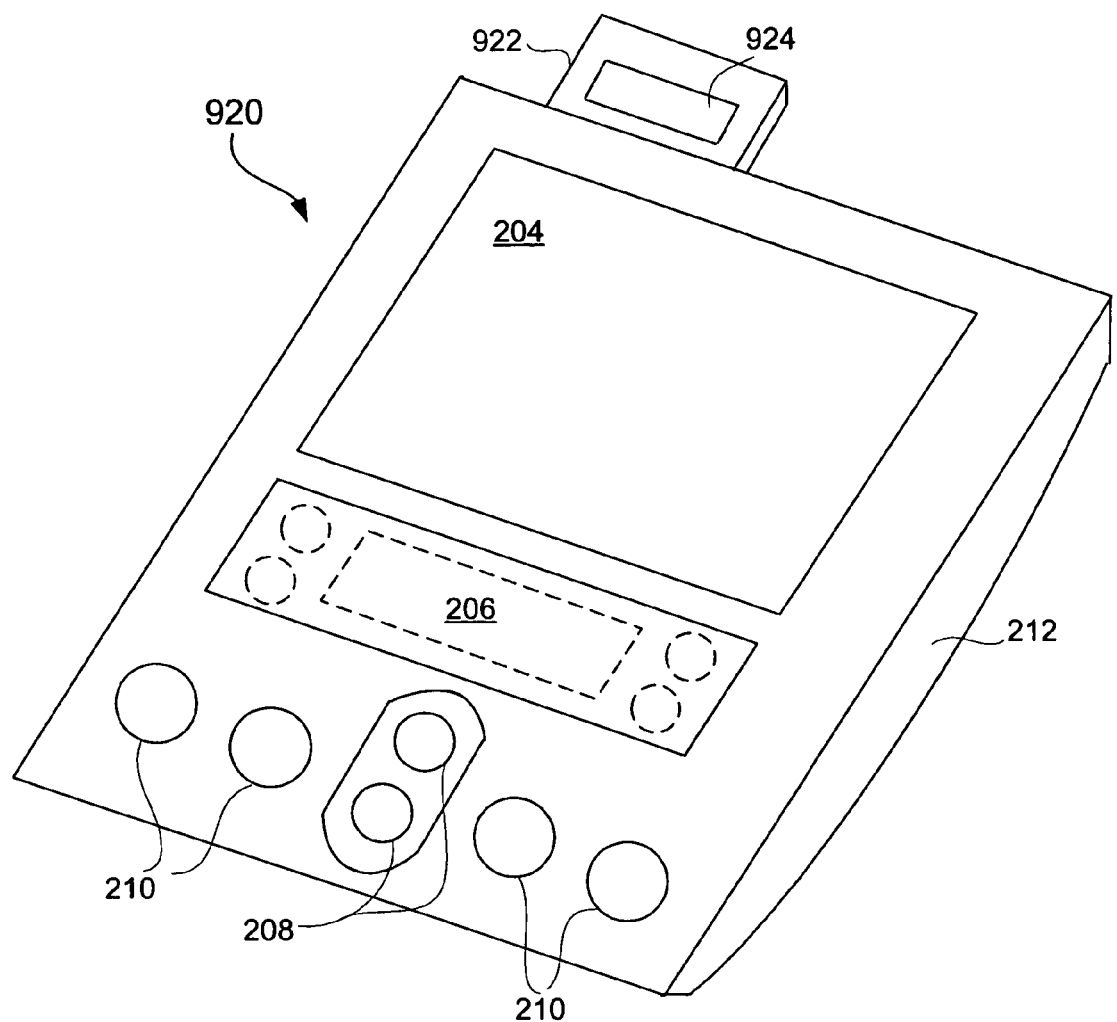
FIG. 9B is a perspective view of a personal digital assistant with an attachable directional speaker according to another embodiment of the invention.

FIG. 9B is a perspective view of a personal digital assistant 920 according to another embodiment of the invention. The personal digital assistant 920 is also generally similar to the personal digital assistant 200 shown in FIG. 2. However, the personal digital assistant 920 further includes a card 922 that is inserted into a card slot of the personal digital assistant 920.

The card 922 is an add-on card that provides directional audio capabilities for the personal digital assistant 920. The card 922 includes a directional speaker 904. The directional speaker 904 provides confined audio output in a particular direction as noted above with respect to other embodiments. The personal digital assistant 920 may or may not already support various other communications capabilities such as audio or video input, wireless voice communications, and wireless data transfer. The card 922 can include circuitry within the housing of the card 922 to support the directional speaker 924. The circuitry can pertain to various discrete electronic devices and/or integrated circuits. The circuitry can thus supplement the circuitry of the personal digital assistant 900. Alternatively, the card 922 may rely significantly on circuitry within the personal digital assistant 920.

The card 902, 922 can also take various forms. In one example, the card 902, 922 is a rectangular card often known as a PC-CARD or PCMCIA card. In another example, the card 902, 922 is of a smaller scale than a PC-CARD or PCMCIA card, such as a mini-card. In yet another example, the card 902, 922 is a peripheral device that plugs directly into a peripheral port (e.g., USB or FireWire), or is a peripheral device that is tethered to the personal digital assistant through a wire such as shown in FIG. 10.

Figure 10:
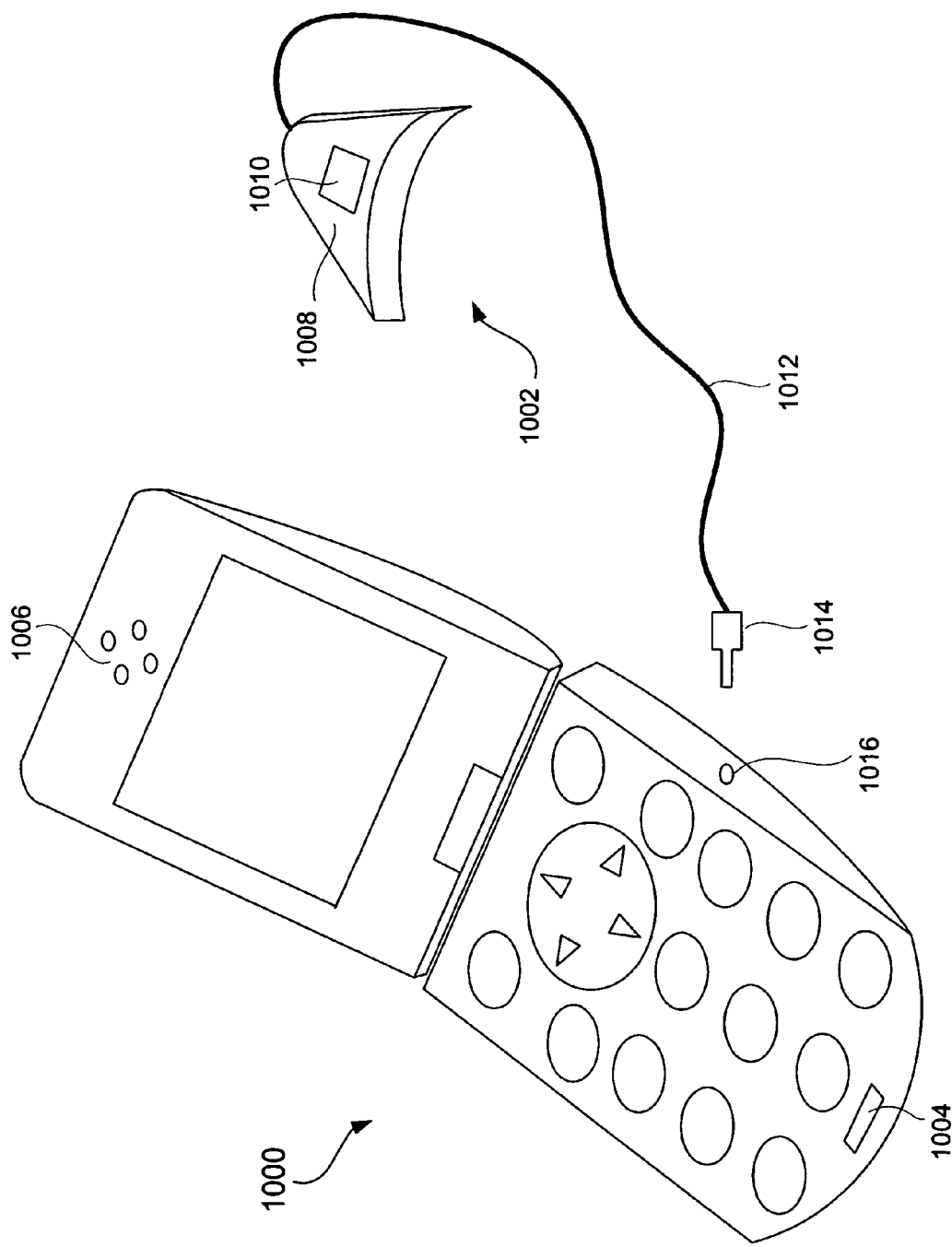
FIG. 10 is a perspective view of a mobile telephone with yet another attachable directional speaker according to one embodiment of the invention.

FIG. 10 is a perspective view of a mobile telephone 1000 and a peripheral attachment 1002. The mobile telephone 1000 includes a microphone 1004 and an ear speaker 1006. The peripheral device 1002 is an add-on to the mobile telephone 1000 to provide an external speaker arrangement for use by the user of the mobile telephone 1000. More particularly, the peripheral attachment 1002 includes a base 1008 that supports and positions a directional speaker 1010. The directional speaker 1010 has characteristics as noted above, namely, directionally constrained audio sound output. The base 1008 supports the directional speaker 1010. By repositioning the base 1008, the particular direction in which the constrained audio output is directed can be altered. The direction of the audio output can also be adjusted electronically by the techniques as described above.

The base 1008 is also connected to a cord 1012 that, in turn, has a connector 1014. The connector 1014 can plug into a receptacle 1016 of the mobile phone 1000. In one example, the receptacle 1016 pertains to a headset jack or external speaker connector associated with the mobile telephone 1000. The housing 1008 contains electronics to convert the standard audio signals that would be delivered to the housing 1008 via the receptacle 1016 of the mobile telephone 1000. The electronic circuitry (e.g. pre-processing circuits in FIG. 4A) would then convert the audio signals to ultrasonic drive signals that would be used to drive the directional speaker 1010. The power necessary for the electronic circuitry within the base 1008 can be supplied by a battery or by a connection to a power source. The connection can be to a separate power source or to the power source associated with the mobile telephone 1000. Such connection can be through the cord 1012 or another cord. In another example, the receptacle 1016 can pertain to a peripheral port (e.g., Universal Serial Bus (USB) or FireWire, etc.). If the port provides both data and power, the electronics within the base 1008 can be powered via the cable of the peripheral port. Still further, such ports can transmit data signal to the base 1008, which can produce the drive signal for the directional speaker 1010. In other words, at least a portion of the pre-processing operations can be performed by the mobile telephone 1000. In such an embodiment, the electronics required in the base 1008 can be reduced as compared to other embodiments because electronic capabilities (e.g., circuitry) in the mobile telephone 1000 can be used to perform some of the operations needed to operate the directional speaker 1010 of the peripheral attachment 1002.

In one embodiment, the peripheral attachment 1002 can rest on a flat surface, such as a table. In another embodiment, the peripheral attachment 1002 can attach to a surface by any of a variety of means, including by way of adhesive, magnetic, clip or the like. For example, the peripheral attachment 1002 can be attached to some portion of the electronic device itself.

Figure 11:
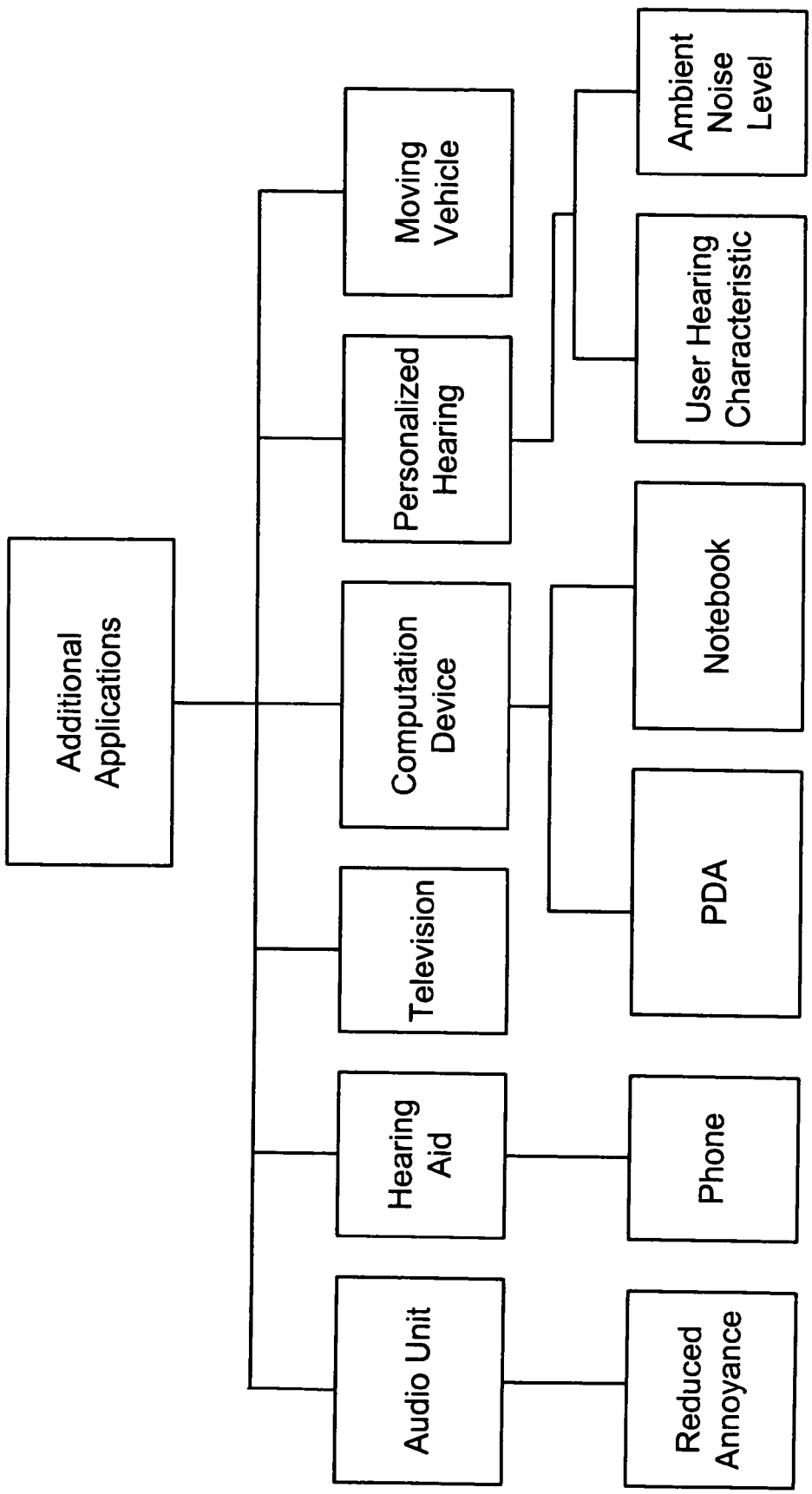
FIG. 11 is a diagram depicting examples of additional applications associated with the invention.

FIG. 11 is a diagram depicting additional applications associated with the present invention.

A number of embodiments have been described where the portable electronic device with a directional speaker is a mobile telephone. However, the invention can be applied to various other applications, with a number of examples shown in FIG. 11. These various embodiments can be used separately or in combination.

In one embodiment, the device can be an audio unit, such as a MP3 player, a CD player or a radio. Such systems can be considered one-way communication systems.

In another embodiment, the device can be an audio output device, such as for a stereo system, television or a video game player. In this embodiment, the device may not be portable. For example, the user can be playing a video game and instead of having the audio signals transmitted by a normal speaker, the audio signals, or a representation of the audio signals, are directed to a directional speaker. The user can then hear the audio signals in a directional manner, reducing the chance of annoying or disturbing people in his immediate environment.

In another embodiment, the device can, for example, be used for a hearing aid. Different embodiments on hearing enhancement through personalizing or tailoring to the hearing of the user have been described in U.S. patent application Ser. No. 10/826,527, filed concurrently, and entitled, "DIRECTIONAL HEARING ENHANCEMENT SYSTEMS," which is hereby incorporated herein by reference.

In one embodiment, the wireless communication device can function both as a hearing aid and a cell phone. When there are no incoming calls, the system functions as a hearing aid. On the other hand, when there is an incoming call, instead of capturing audio signals in its vicinity, the system transmits the incoming call through the directional speaker to be received by the user.

In yet another embodiment, the device can include a monitor or a display. A user can watch television or video signals in the public, again with reduced possibility of disturbing people in the immediate surroundings because the audio signals are directional.

The device can also include the capability to serve as a computation system, such as in a personal digital assistant (PDA) or a notebook computer. For example, as a user is working on the computation system for various tasks, the user can simultaneously communicate with another person in a hands-free manner. Data generated by a software application the user is working on using the computation system can be transmitted digitally with the voice signals to a remote device.

In yet another embodiment, the device can be a personalized system. The system can selectively amplify different audio frequencies by different amounts based on user preference or user hearing characteristics. In other words, the audio output can be tailored to the hearing of the user. The personalization process can be done periodically, such as once every year, similar to periodic re-calibration. Such re-calibration can be done by another device, and the results can be stored in a memory device. The memory device can be a removable media card, which can be inserted into the system to personalize the amplification characteristics of the directional speaker as a function of frequency. The system can also include an equalizer that allows the user to personalize the amplitude of the speaker audio signals as a function of frequency.

The device can also be personalized based on the noise or sound level in the vicinity of the user. The device can sense the noise or sound level in its immediate vicinity and change the amplitude characteristics of the audio signals as a function of the noise or sound level.

A number of embodiments have been described with the speaker being directional. In one embodiment, a speaker is considered directional if the FWHM of its ultrasonic signals is less than about 1 radian or around 57 degrees. In another embodiment, a speaker is considered directional if the FWHM of its ultrasonic signals is less than about 30 degrees. In yet another embodiment, a speaker is transmitting signals towards a user's ear. The speaker is considered directional if in the vicinity of the user's ear, 75% of the power of its audio signals is within an area of less than 50 square inches. In a further embodiment, a speaker is considered directional if in the vicinity of the ear, 75% of the power of its audio signals is within an area of less than 20 square inches. In yet a further embodiment, a speaker is considered directional if in the vicinity of the ear, 75% of the power of its audio signals is within an area of less than 13 square inches.

Also, in one embodiment, a speaker can be considered a directional if most of the power of its audio signals is propagating in one general direction, confined within a virtual cone, and the cross-sectional angle of the cone is less than 60 degrees. In another embodiment, the cross-sectional angle of the cone is less than 45 degrees.

In another embodiment, a speaker is considered a directional if it is driven by ultrasonic signals. Such a directional speaker is also referred to herein as an ultrasonic speaker. Typically, the ultrasonic speaker produces an ultrasonic output that is converted into an audio output by mixing in air. For example, the ultrasonic output results from modulating audio output with an ultrasonic carrier wave, and the ultrasonic output is thereafter self-demodulated through non-linear mixing in air to produce the audio signals.

The device is also applicable in a moving vehicle, such as a car, a boat or a plane. Again, a directional audio conversion apparatus can be integrated into or attachable to the moving vehicle. As an example, the moving vehicle can be a car. At the front panel or dashboard of the car, there can be a USB, PCMCIA or other types of interface port. The apparatus can be inserted into the port to generate directional audio signals.

In yet another embodiment, one or more directional speakers are incorporated into a moving vehicle. The speakers can be used for numerous applications, such as personal entertainment and communication applications, in the vehicle.

In one embodiment, the directional speaker emits ultrasonic beams. The frequency of the ultrasonic beams can be, for example, in the 40 kHz range, and the beams can be diverging. For example, a 3-cm (diameter) emitter generates an ultrasonic beam that diverges to a 30-cm (diameter) cone after propagating for a distance of 20 to 40 cm. With the diameter of the beams increased by 10 dB, the ultrasonic intensity is reduced by around 20 dB. In another embodiment, the frequency of the beams is at a higher range, such as in the 200 to 500 kHz range. Such higher frequency ultrasonic beams experience higher attenuation in air, such as in the 8 to 40 dB/m range depending on the frequency. In yet another embodiment, the beams with higher ultrasonic frequencies, such as 500 kHz, are diverging beams also. Such embodiments with higher frequencies and diverging beams are suitable to other applications also, such as in areas where the distance of travel is short, for example, 20 cm between the speaker and ear.

Regarding the location of the speaker, it can be mounted directly above where a user should be, such as on the rooftop of the vehicle above the seat. The speaker can be located closer to the back than the front of the seat because when a person sits, the person typically leans on the back of the seat. In another embodiment, the directional speaker is mounted slightly further away, such as at the dome light of a car, with ultrasonic beams directed approximately at the head rest of a user's seat inside the car. For example, one speaker is located in the vicinity of the corner of the dome-light that is closest to the driver, with the direction of the signals, pointing towards the approximate location of the head of the driver. Signals not directly received by the intended recipient, such as the driver, can be scattered by the driver and/or the seat fabrics thereby reducing the intensity of the reflected signals to be received by other passengers in the car.

Instead of emitting ultrasonic signals, in one embodiment, the speakers can emit audio beams, with any directivity depending on the physical structure of the speaker. For example, the speaker is a horn or cone or other similar structure. The directivity of such a speaker depends on the aperture size of the structure. For example, a 10-cm horn has a $\lambda/D$ of about 1 at 3 kHz, and a $\lambda/D$ of about 0.3 at 10 kHz. Thus, at low frequency, such an acoustic speaker offers relatively little directivity. Still, the intensity of the beams goes as $1/R^2$, with R being the distance measured from, for example, the apex of the horn. To achieve isolation, proximity becomes more relevant. In such an embodiment, the speaker is positioned close to the user. Assume that the speaker is placed directly behind the passenger's ears, such as around 10 to 15 cm away. The speaker can be in the head rest or head cushion of the user's seat. Or, the speaker can be in the user's seat, with the beam directed towards the user. If other passengers in the vehicle are spaced at least 1 meter away from the user, based on propagation attenuation (or attenuation as the signals travel in air), the sound isolation effect is around 16 to 20 dB. The structure of the horn or cone can provide additional isolation effect, such as another 6 to 10 dB.

In one embodiment, the user can control one or more attributes of the beams. For example, the user can control the power, direction, distance or coverage of the beams.

Regarding the location of the controls, if the vehicle is a car, the controls can be on the dash board of the vehicle. In another embodiment, the controls are in the armrest of the seat the user is sitting on.

The controls can be mechanical. For example, the speaker is at the dome light, and there can be a rotational mechanism at the dome light area. The rotational mechanism allows the user to adjust the direction of beam as desired. In one embodiment, the rotational mechanism allows two-dimensional rotations. For example, the beams are emitting at a 30 degrees angle from the roof top, and the rotational mechanism allows the beams to be rotated 180 degrees around the front side of the vehicle. In another embodiment, the elevation angle can also be adjusted, such as in the range of 20 to 70 degrees from the roof top.

Another mechanical control can be used to turn the speaker off. For example, when the user stands up from the user's seat, after a preset amount of time, such as 3 seconds, the speaker is automatically turned off.

The controls can also be in a remote controller. The remote controller can use BlueTooth, WiFi, ultrasonic, or infrared or other wireless technologies. The remote controller can also include a fixed or detachable display. The remote controller can be a portable device.

Regarding other attributes of the beam, as to the power level of the signals, the sound level does not have to be too high. For example, the sound level can be about 60 dB SPL at 5 cm away from the speaker.

The content of the signals from the speaker can be accessed in a number of ways. In one embodiment, the content, which can be from a radio station, is wirelessly received by the speaker. For example, the content can be received through the Internet, a WiFi network, a WiMax network, a cell-phone network or other types of networks.

The speaker does not have to receive the content directly from the broadcaster, or the source. In one embodiment, the vehicle receives the content wirelessly from the source, and then through a wired or a wireless connection, the vehicle transmits the content to the speaker.

In yet another embodiment, the content can be selected from a multimedia player, such as a CD player, from the vehicle. The multimedia player can receive from multiple channels to support multiple users in the vehicle. Again, the contents or channels can be received from a broadcast station and selected locally. Or, the content can be created on-demand and streamed to the user demanding it by a wireless server station. In yet another embodiment, the content can be downloaded to a multimedia player from a high-speed wireless network in its entirely before being played.

Another type of control is to select the radio station or a piece of music on a multimedia player. Again, these types of selection control can be from a fixed location in the vehicle, such as there can be control knobs at the dashboard, console, arm rest, door or seat of the vehicle. Or, as another example, the selection controller can be in a portable device.

A number of embodiments have been described regarding one speaker. In yet another embodiment, there can be more than one speaker for a user. The multiple speakers allow the creation of stereo or surround sound effects.

As described regarding the multimedia player, the player can receive from multiple channels to support multiple users in the vehicle. If there is more than one user in the vehicle, each user can have a directional speaker or a set of directional speakers. Regarding the locations of the speakers for multiple users, in one embodiment, they are centralized. All of the speakers are, for example, at the dome light of a vehicle. Each user has a corresponding set of directional beams, radiating from the dome towards the user. Or, the speakers can be distributed. Each user can have a speaker mounted, for example, on the rooftop above where the user should be seating, or in the user's headrest. Regarding control, each user can independently control the signals to that user. For example, a user's controller can control the user's own set of beams, or to select the content of what the user wants to hear. Each user can have a remote controller. In another embodiment, the controller for a user is located at the armrest, seat or door for that user.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The invention can be implemented in software, hardware or a combination of hardware and software. A number of embodiments of the invention can also be embodied as computer readable code on a computer readable medium. The computer readable medium is any data storage device that can store data, which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield different advantages. One advantage of the invention is that audio output from an electronic device can be directionally constrained. The directionally constrained audio output can provide a certain degree of privacy for the user of the electronic device. Another advantage of the invention is to facilitate user interaction with the electronic device while also providing audio output to the user.

Numerous specific details are set forth in order to provide a thorough understanding of the invention. However, it will be understood by those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A peripheral apparatus for a personal, handheld wireless communication device, said peripheral apparatus comprising:
   a directional speaker that provides ultrasonic sound output in a particular direction; and
   a controller operatively connected to said directional speaker, said controller operating to supply signals to said directional speaker so that the ultrasonic sound is output by said directional speaker,
   wherein the ultrasonic sound output by said directional speaker results in audio sound in the particular direction for a user of the personal, handheld wireless communication device, and
   wherein said peripheral apparatus is configured to be removeably connected to the personal, hand-held wireless communication device,
   wherein said peripheral apparatus is portable and able to be hand-held, and
   wherein while said peripheral apparatus is connected to the personal, hand-held wireless communication device and in use, the personal, hand-held wireless communication device with said peripheral apparatus remain portable and hand-held.

2. A peripheral apparatus as recited in claim 1, wherein the personal, handheld wireless communication, device has a peripheral connection port, wherein said peripheral apparatus connects to the personal, handheld wireless communication device at the peripheral connection port, and wherein the peripheral connection port is an electronic card slot or a serial bus port.

3. A peripheral apparatus as recited in claim 2,
   wherein said peripheral apparatus further comprises a housing for said peripheral apparatus, and
   wherein said peripheral apparatus further comprises a mechanical mechanism that allows said directional speaker to move relative to said housing, thereby allowing repositioning of said directional speaker to direct the sound output towards different directions.

4. A peripheral device for a hand-held computing device, said peripheral device comprising:
   a housing;
   a directional speaker coupled to said housing, said directional speaker being configured to provide ultrasonic sound output in a particular direction, wherein the ultrasonic sound output by said directional speaker results in audio sound in the particular direction for a user of the computing device;

a controller within said housing and operatively connected to said directional speaker, said controller operating to supply signals to said directional speaker so that the ultrasonic sound is output by said directional speaker; and a port connector configured to assist with coupling said peripheral device to the computing device to allow the computing device to drive said directional speaker to produce the audio sound, wherein said peripheral device is a hand-held device and remains hand-held even when in use with the computing device.

5. A peripheral device as recited in claim 4, wherein said directional speaker is integral to said housing, and wherein when said peripheral device is operatively connected to the computing device, the said computing device directs audio signals to said peripheral device.

6. A peripheral device as recited in claim 4, wherein said peripheral device further comprises a cable that connects said peripheral device to the computing device via a connector or plug.

7. A peripheral device as recited in claim 4, wherein said peripheral device further comprises a camera.

8. A peripheral device as recited in claim 4, wherein said housing is configured as a peripheral bus plug-in card.

9. A peripheral device as recited in claim 4, wherein said port connector is a USB connector.

10. A peripheral apparatus for a personal, handheld wireless communication device, said peripheral apparatus comprising:

a directional speaker that provides ultrasonic sound output in a particular direction; and a controller operatively connected to said directional speaker, said controller operating to supply signals to said directional speaker so that the ultrasonic sound is output by said directional speaker, wherein the ultrasonic sound output by said directional speaker results in audio sound in the particular direction for a user of the personal, handheld wireless communication device, and wherein said peripheral apparatus is configured to be removeably connected to the personal, hand-held wireless communication device, wherein said peripheral apparatus is portable and able to be hand-held, and wherein while said peripheral apparatus is connected to the personal, hand-held wireless communication device and in use said peripheral apparatus remains portable and able to be hand-held.

11. A peripheral apparatus as recited in claim 10, wherein the personal, handheld wireless communication device has a peripheral connection port, wherein said peripheral apparatus connects to the personal, handheld wireless communication device at the peripheral connection port, and wherein the peripheral connection port is an electronic card slot or a serial bus port.

12. A peripheral apparatus as recited in claim 10, wherein said peripheral apparatus further comprises a housing for said peripheral apparatus, and wherein said peripheral apparatus further comprises a mechanical mechanism that allows said directional speaker to move relative to said housing, thereby allowing repositioning of said directional speaker to direct the sound output towards different directions.

* * * * *

UNITED STATES PATENT AND TRADEMARK OFFICE
CERTIFICATE OF CORRECTION

PATENT NO. : 7,801,570 B2
APPLICATION NO. : 10/826531
DATED : September 21, 2010
INVENTOR(S) : Cheung et al.

It is certified that error appears in the above-identified patent and that said Letters Patent is hereby corrected as shown below:

In the Specification:

Column 8, line 27 " $\cos \omega_c t$ " should be --cos ($\omega_c t$--.

In the Claims:

Column 19, line 20 (claim 5, line 4) "the said computing" should be --the computing--.

Signed and Sealed this
Ninth Day of April, 2013

Teresa Stanek Rea
*Acting Director of the United States Patent and Trademark Office*